(12) United States Patent
Harada et al.

(10) Patent No.: US 11,330,424 B2
(45) Date of Patent: May 10, 2022

(54) TERMINAL, BASE STATION, AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Liu Liu, Beijing (CN); Lihui Wang, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/930,662

(22) Filed: Jul. 16, 2020

(65) Prior Publication Data

US 2020/0351640 A1 Nov. 5, 2020

Related U.S. Application Data

(63) Continuation of application No. 16/088,302, filed as application No. PCT/JP2017/013136 on Mar. 30, 2017, now abandoned.

(30) Foreign Application Priority Data

Mar. 31, 2016 (JP) ................................. 2016-073412
May 20, 2016 (JP) ................................. 2016-101884

(51) Int. Cl.
*H04W 8/22* (2009.01)
*H04W 16/14* (2009.01)
*H04W 72/04* (2009.01)
*H04W 72/14* (2009.01)
*H04W 74/08* (2009.01)
*H04W 74/00* (2009.01)

(52) U.S. Cl.
CPC .............. *H04W 8/22* (2013.01); *H04W 16/14* (2013.01); *H04W 72/042* (2013.01); *H04W 72/0413* (2013.01); *H04W 72/0446* (2013.01); *H04W 72/0453* (2013.01); *H04W 72/14* (2013.01); *H04W 74/0808* (2013.01); *H04W 74/006* (2013.01)

(58) Field of Classification Search
CPC ......... H04W 74/0808; H04W 72/0413; H04W 72/042; H04W 72/0446; H04W 72/0453; H04W 72/14; H04W 8/22; H04W 16/14
See application file for complete search history.

(56) References Cited

U.S. PATENT DOCUMENTS

2015/0092702 A1    4/2015  Chen et al.
2016/0095139 A1*   3/2016  Ding ................. H04W 28/26
                                                     370/329
(Continued)

OTHER PUBLICATIONS

International Search Report issued in PCT/JP2017/013136 dated Jun. 20, 2017 (1 page).
Written Opinion of the International Searching Authority issued in PCT/JP2017/013136 dated Jun. 20, 2017 (5 pages).
Ericsson; "PUCCH Design for Enhanced LAA"; 3GPP TSG-RAN WG1#84 R1-160998; St Julian's, Malta, Feb. 15-19, 2016 (4 pages).

(Continued)

*Primary Examiner* — Gary Mui
(74) *Attorney, Agent, or Firm* — Osha Bergman Watanabe & Burton LLP

(57) ABSTRACT

A terminal is disclosed including a processor that controls a period to hold an uplink control information (UCI) based on information provided by a downlink control information (DCI) and a transmitter that transmits multiple UCIs, including the UCI held in the period, together. In other aspects, a radio communication method for a terminal and a base station are also disclosed.

4 Claims, 19 Drawing Sheets

(56) References Cited

U.S. PATENT DOCUMENTS

| | | | |
|---|---|---|---|
| 2017/0006641 A1 | 1/2017 | Dinan | |
| 2017/0070277 A1* | 3/2017 | Si | H04B 7/0456 |
| 2017/0164352 A1 | 6/2017 | Yang et al. | |
| 2017/0373801 A1* | 12/2017 | Bergstrom | H04L 1/1896 |
| 2018/0027549 A1 | 1/2018 | Wang et al. | |
| 2018/0069660 A1 | 3/2018 | Yi et al. | |
| 2018/0124749 A1* | 5/2018 | Park | H04W 74/08 |
| 2018/0198569 A1* | 7/2018 | Lyu | H04W 72/0413 |
| 2018/0249458 A1* | 8/2018 | He | H04L 1/1861 |
| 2018/0278401 A1* | 9/2018 | Ahn | H04L 1/003 |
| 2018/0352575 A1 | 12/2018 | You et al. | |
| 2018/0375619 A1* | 12/2018 | Hwang | H04W 72/0446 |
| 2018/0376490 A1 | 12/2018 | Lunttila et al. | |
| 2019/0007943 A1 | 1/2019 | Takeda et al. | |
| 2019/0021112 A1 | 1/2019 | Harada et al. | |
| 2019/0036831 A1 | 1/2019 | Li et al. | |
| 2019/0090258 A1* | 3/2019 | Ryu | H04B 7/0632 |
| 2019/0097779 A1* | 3/2019 | Wu | H04L 1/1858 |

OTHER PUBLICATIONS

MediaTek Inc.; "Remaining CP issues for Pucch on SCell"; 3GPP TSG-RAN2 #90 Meeting, R2-152137; Fukuoka, Japan; May 25-29, 2015 (3 pages).

NTT Docomo, Inc.; "Discussion on UCI transmission for eLAA UL"; 3GPP TSG RAN WG1 Meeting #85, R1-165188; Nanjing, China; May 23-27, 2016 (5 pages).

AT&T "Drivers, Benefits and Challenges for LTE in Unlicensed Spectrum"; 3GPP TSG-RAN Meeting #62 RP-131701; Busan, Korea; Dec. 3-6, 2013 (3 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

Office Action issued in the counterpart Japanese Patent Application No. 2018-509406, dated May 25, 2021 (6 pages).

* cited by examiner

| UCI TX mode | UCI information | Transmission position | |
|---|---|---|---|
| | | Licensed (PUCCH+PUSCH) | Unlicensed (PUSCH) |
| 0 | Licensed | A/N, P-CSI, A-CSI, SR | - |
| | Unlicensed | A/N, P-CSI, A-CSI | - |
| 1 | Licensed | A/N, P-CSI, A-CSI, SR | - |
| | Unlicensed | A/N, P-CSI | A-CSI |
| 2 | Licensed | A/N, P-CSI, A-CSI, SR | - |
| | Unlicensed | A/N | P-CSI, A-CSI |
| 3 | Licensed | A/N, P-CSI, A-CSI, SR | - |
| | Unlicensed | - | A/N, P-CSI, A-CSI |

FIG. 4

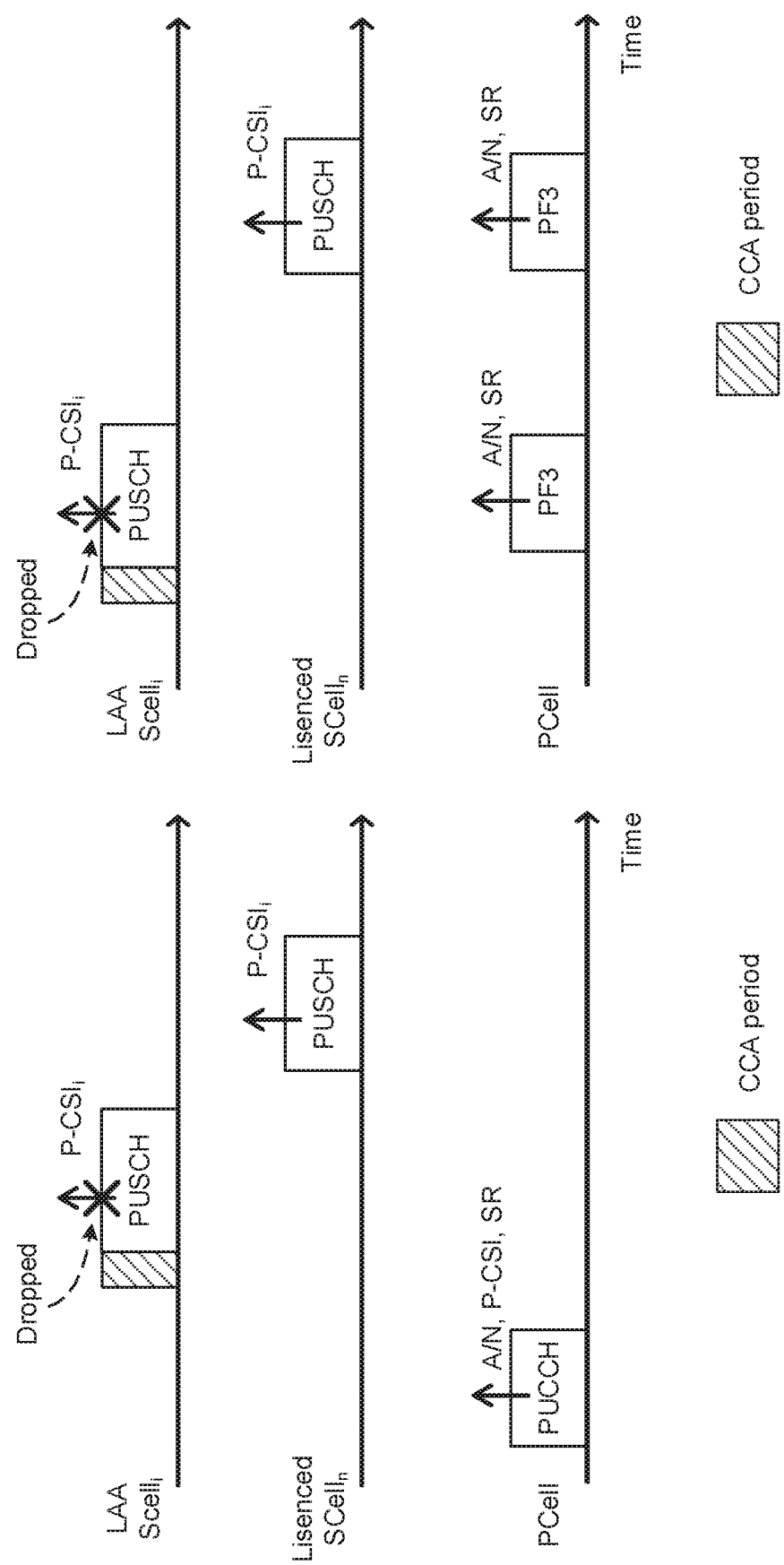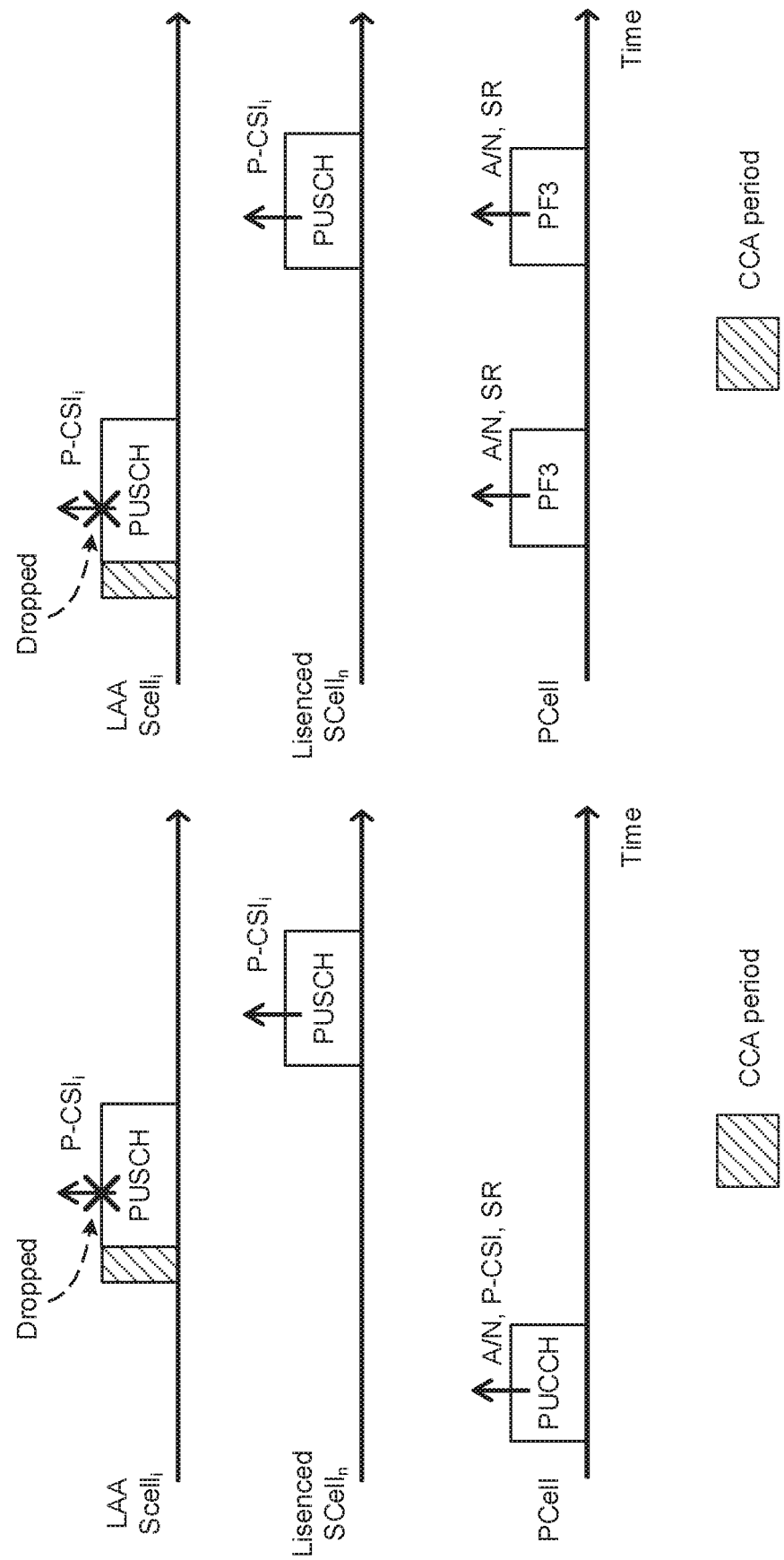

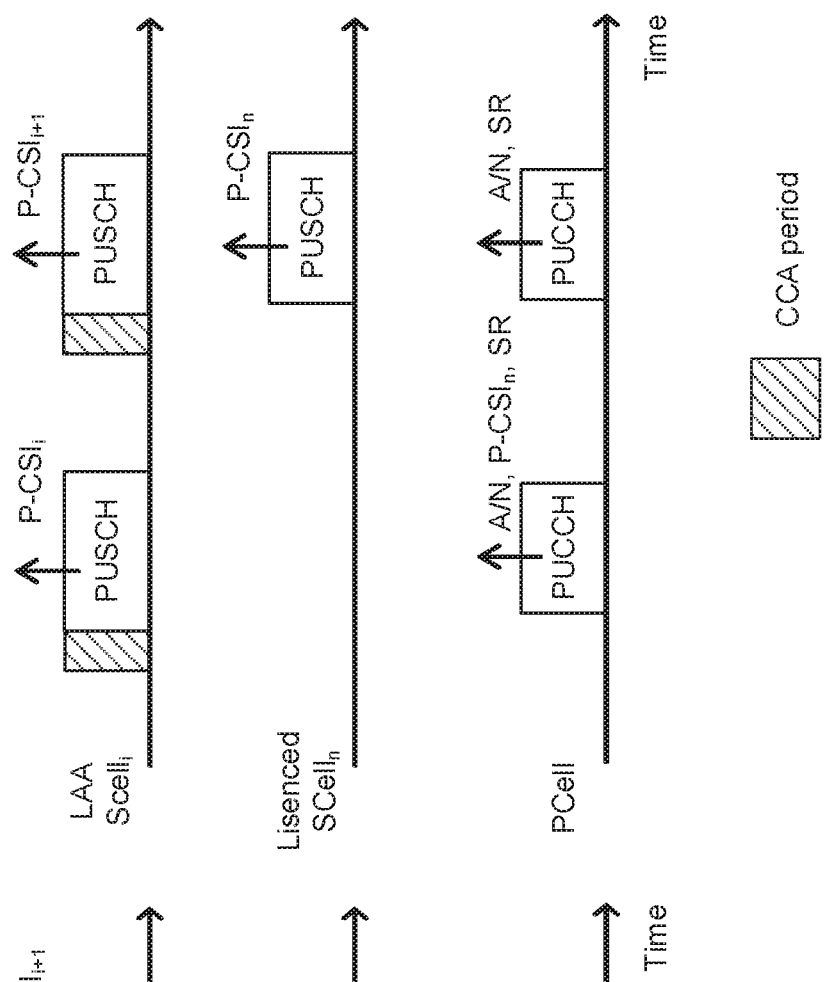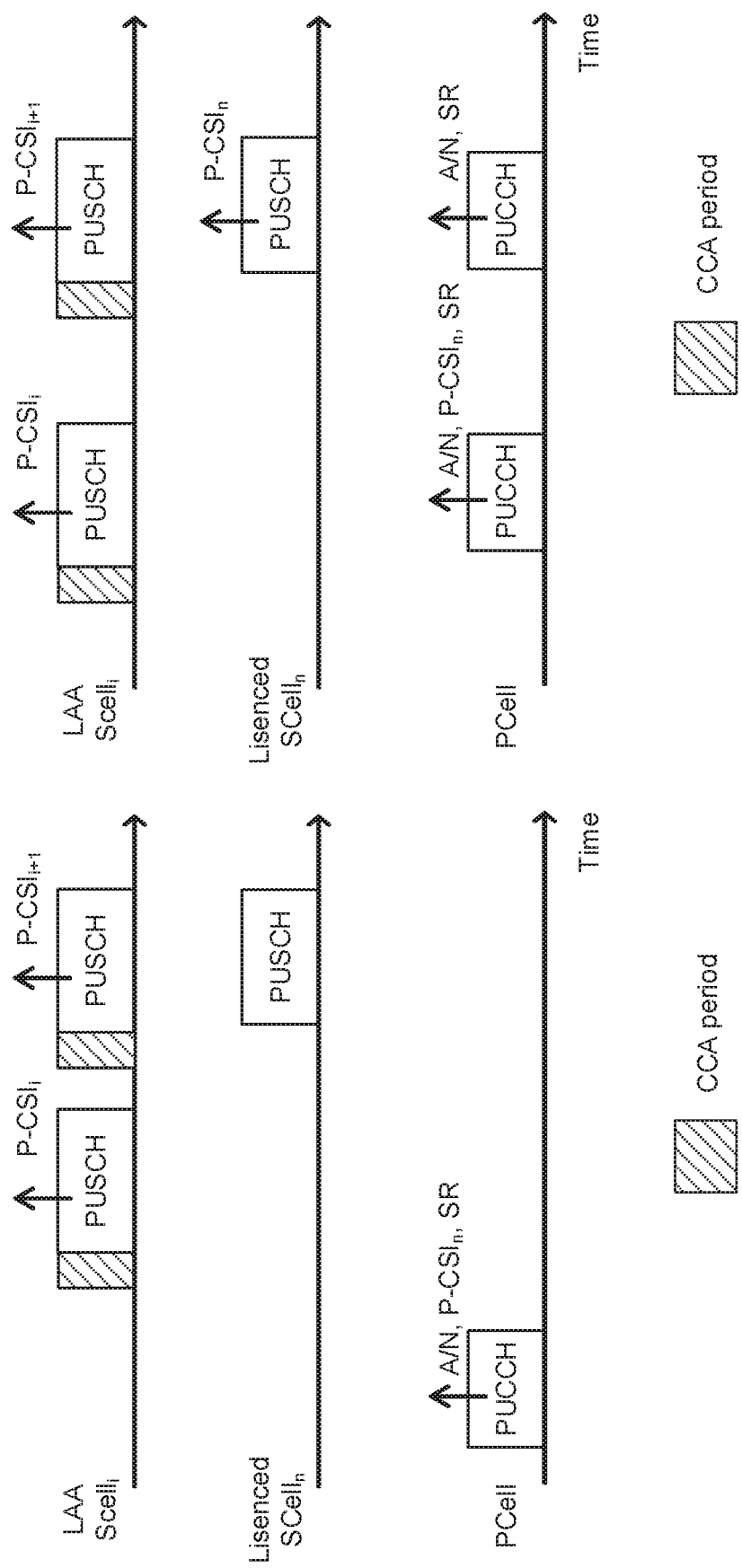
FIG. 6A
FIG. 6B

TERMINAL, BASE STATION, AND RADIO COMMUNICATION METHOD

CROSS-REFERENCE TO RELATED APPLICATIONS

This application is a continuation application and thereby claims benefit under 35 U.S.C. § 120 to U.S. patent application Ser. No. 16/088,302, filed on Sep. 25, 2018, titled "USER TERMINAL, RADIO BASE STATION AND RADIO COMMUNICATION METHOD," which is a national stage application of PCT Application No. PCT/JP2017/013136, filed on Mar. 30, 2017, which claims priority to Japanese Patent Application No. 2016-073412, filed on Mar. 31, 2016, and to Japanese Patent Application No. 2016-101884, filed on May 20, 2016. The contents of these applications are incorporated by reference in their entirety.

TECHNICAL FIELD

The present invention relates to a user terminal, a radio base station and a radio communication method in a next-generation mobile communication system.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12, etc.) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

The specifications of Rel. 8 to 12 LTE have been drafted assuming exclusive operation in frequency bands that are licensed to operators (also referred to as "licensed bands"). As licensed bands, for example, 800 MHz, 1.7 GHz and 2 GHz are used.

In recent years, user traffic has been increasing steeply following the spread of high-performance user terminals (UE: User Equipment) such as smart-phones and tablets. Although more frequency bands need to be added to accommodate this increasing user traffic, licensed bands have limited spectra (licensed spectra).

Consequently, a study is in progress with Rel. 13 LTE to enhance the frequencies of LTE systems by using bands of unlicensed spectra (also referred to as "unlicensed bands") that are available for use apart from licensed bands (see non-patent literature 2). For example, the 2.4 GHz band and the 5 GHz band, where Wi-Fi (registered trademark) and Bluetooth (registered trademark) can be used, are under study for use as unlicensed bands.

To be more specific, with Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). Note that, in the future, dual connectivity (DC) between licensed bands and unlicensed bands and stand-alone (SA) of unlicensed bands may become the subject of study under LAA.

For unlicensed bands in which LAA is run, a study is in progress to introduce interference control functionality in order to allow co-presence with other operators' LTE, Wi-Fi or different systems. In Wi-Fi, LBT (Listen Before Talk), which is based on CCA (Clear Channel Assessment), is used as an interference control function for use within the same frequency. LBT refers to the technique of "listening" (sensing) before transmitting signals, and controlling transmission based on the result of listening. For example, in Japan and Europe, the LBT function is stipulated as mandatory in systems that run in the 5 GHz unlicensed band such as Wi-Fi.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April 2010

Non-Patent Literature 2: AT&T, "Drivers, Benefits and Challenges for LTE in Unlicensed Spectrum, 3GPP TSG-RAN Meeting #62 RP-131701," Nov. 26, 2013

SUMMARY OF THE INVENTION

Technical Problem

Now, research is on-going to transmit uplink control information (UCI) in cells of unlicensed bands. However, in cells of unlicensed bands, whether or not transmission is possible changes depending on the result of LBT, and, unless the UCI transmission operation in unlicensed band cells is adequately specified, UCI may not be transmitted at desired timing, and the throughput of communication and/or the quality of communication may be degraded.

The present invention has been made in view of the above, and it is therefore an object of the present invention to provide a user terminal, a radio base station and a radio communication method, whereby UCI can be transmitted adequately, at desired timing, in a carrier where LBT is configured.

Solution to Problem

According to one aspect of the present invention, a user terminal has a transmission section that transmits signals in carriers where listening is performed before uplink transmission, a receiving section that receives PUCCH cell configuration information as to whether or not at least one of the carriers is a cell where a PUCCH (Physical Uplink Control Channel) is transmitted, and a control section that controls transmission of uplink control information (UCI) in the carriers based on the PUCCH cell configuration information.

Technical Advantage of the Invention

According to the present invention, it is possible to transmit UCI adequately, at a desired timing in a carrier where LBT is configured.

BRIEF DESCRIPTION OF THE DRAWINGS

FIG. 4 is a diagram to illustrate examples of UCI transmission modes according to a third embodiment;

FIGS. 5A and 5B are diagrams to illustrate examples of transmission control in UCI transmission mode 1;

FIGS. 6A and 6B are diagrams to illustrate examples of transmission control in UCI transmission mode 2;

DESCRIPTION OF EMBODIMENTS

Figure 1:
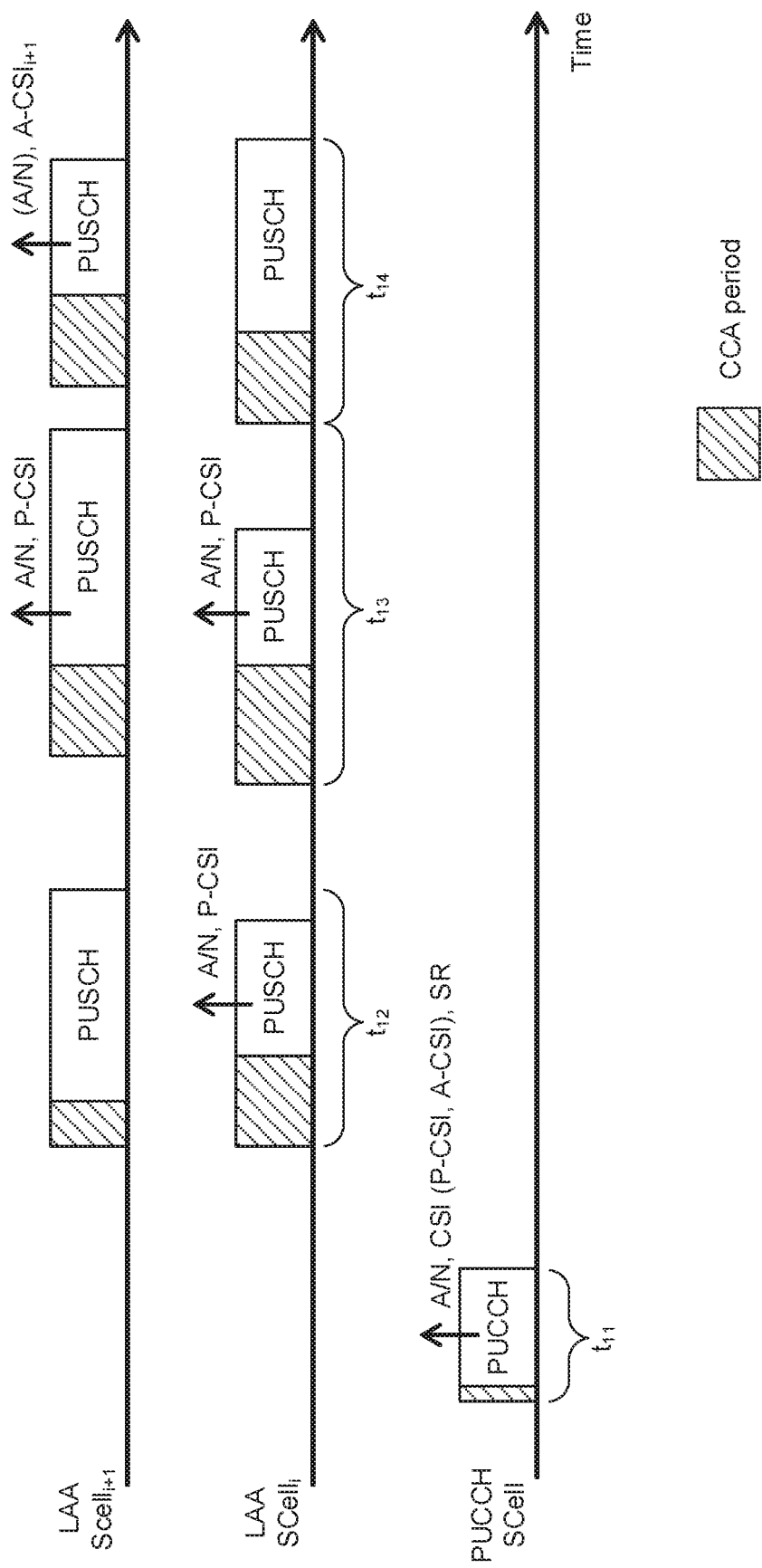
FIG. 1 is a diagram to explain the UCI transmission operation according to embodiment 2.1.

In systems that run LTE/LTE-A in unlicensed bands (for example, LAA systems), interference control functionality is likely to be necessary in order to allow co-presence with other operators' LTE, Wi-Fi and/or other systems. Note that systems that run LTE/LTE-A in unlicensed bands may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier of an unlicensed band (which may also be referred to as an "unlicensed cell," an "unlicensed CC," etc.) detects another entity (for example, another UE) that is communicating in this unlicensed band carrier, the transmission point is disallowed to make transmission in this carrier.

In this case, the transmission point executes listening (LBT) at a timing that is a predetermined period ahead of transmission timing. To be more specific, by executing LBT, the transmission point searches the whole applicable carrier band (for example, one component carrier (CC)) at a timing that is a predetermined period ahead of a transmission timing, and checks whether or not other devices (for example, radio base stations, UEs, Wi-Fi devices and so on) are communicating in this carrier band.

Note that, in the present specification, "listening" refers to the operation which a given transmission point (for example, a radio base station, a user terminal, etc.) performs before transmitting signals, in order to check whether or not signals to exceed a predetermined level (for example, predetermined power) are being transmitted from other transmission points. Also, this "listening" performed by radio base stations and/or user terminals may be referred to as "LBT," "CCA," "carrier sensing" and so on.

Also, for example, LBT that is performed by an eNB prior to downlink transmission may be referred to as "DL LBT," and, for example, LBT that is performed by a UE prior to uplink transmission may be referred to as "UL-LBT." Information about the carrier where UL-LBT is to be carried out may be reported to the UE, and, based on this information, the UE may identify the carrier and execute UL-LBT.

The transmission point then carries out transmission using this carrier only if it is confirmed that no other apparatus is communicating. For example, if the received power measured by LBT (the received signal power during the LBT period) is equal to or lower than a predetermined threshold, the transmission point determines that the channel is in free state ($LBT_{free}$) and carries out transmission. When a "channel is in free state," this means that, in other words, the channel is not occupied by a specific system, and it is equally possible to say that a channel is "idle," a channel is "clear," a channel is "free," and so on.

On the other hand, if only just a portion of the target carrier band is detected to be used by another piece of apparatus, the transmission point stops its transmission. For example, if the transmission point detects that the received power of a signal from another piece of apparatus in this band exceeds a predetermined threshold, the transmission point determines the channel is in the busy state ($LBT_{busy}$), and makes no transmission. In the event $LBT_{busy}$ is yielded, LBT is carried out again with respect to this channel, and the channel becomes available for use only after the free state is confirmed. Note that the method of judging whether a channel is in the free state or in the busy state based on LBT is by no means limited to this.

As LBT mechanisms (schemes), FBE (Frame Based Equipment) and LBE (Load Based Equipment) are currently under study. Differences between these include the frame configurations to use for transmission/receipt, the channel-occupying time, and so on. In FBE, the LBT-related transmitting/receiving configurations have fixed timings. Also, in LBE, the LBT-related transmitting/receiving configurations are not fixed in the time direction, and LBT is carried out on an as-needed basis.

To be more specific, FBE has a fixed frame cycle, and is a mechanism of carrying out transmission if the result of executing carrier sensing for a certain period (which may be referred to as "LBT duration" and so on) in a predetermined frame indicates that a channel is available for use, and not making transmission but waiting until the next carrier sensing timing if no channel is available.

On the other hand, LBE refers to a mechanism for implementing the ECCA (Extended CCA) procedure of extending the duration of carrier sensing when the result of carrier sensing (initial CCA) indicates that no channel is available for use, and continuing executing carrier sensing until a channel is available. In LBE, random backoff is required to adequately avoid contention.

Note that the duration of carrier sensing (also referred to as the "carrier sensing period") refers to the time (for example, the duration of one symbol) it takes to gain one LBT result by performing listening and/or other processes and deciding whether or not a channel can be used.

A transmission point can transmit a predetermined signal (for example, a channel reservation signal) based on the result of LBT. Here, the result of LBT refers to information about the state of channel availability (for example, "$LBT_{free}$," "$LBT_{busy}$," etc.), which is acquired by LBT in carriers where LBT is configured.

Also, when a transmission point starts transmission based on an LBT result that indicates the free state ($LBT_{free}$) the transmission point can skip LBT and still carry out transmission, for a predetermined period (for example, for 10 to 13 ms). This transmission is also referred to as "burst transmission," "burst," "transmission burst," and so on.

As described above, by introducing interference control that is based on LBT mechanism and that is for use within the same frequency to transmission points in LAA systems, it becomes possible to prevent interference between LAA and Wi-Fi, interference between LAA systems and so on. Furthermore, even when transmission points are controlled independently per operator that runs an LAA system, LBT makes it possible to reduce interference without learning the details of each operator's control.

Also, in LTE/LTE-A, a user terminal (UE: User Equipment) feeds back uplink control information (UCI) to a device on the network side (which is, for example, a radio base station (eNB: eNode B)). The UE transmits UCI by using an uplink control channel (PUCCH: Physical Uplink Control Channel). Also, at times where uplink data transmission is scheduled, the UE may transmit UCI by using an uplink shared channel (PUSCH: Physical Uplink Shared Channel). The radio base station performs data retransmission control, scheduling control and so on, for the UE, based on the UCI received.

UCI that is stipulated in LTE includes channel state information (CSI), which is comprised of a channel quality indicator (CQI), a precoding matrix indicator (PMI), a rank indicator (RI) and so on, retransmission control information (also referred to as "HARQ-ACK (Hybrid Automatic Repeat reQuest-ACKnowledgment)," "ACK/NACK," "A/N," etc.), a scheduling request (SR), and so on.

LAA systems are assumed to apply carrier aggregation to cells of licensed bands (also referred to as "licensed carriers," "licensed CCs," etc.) and cells of unlicensed bands (also referred to as "unlicensed carriers," "unlicensed CCs," etc.). Assuming this case, a study is in progress to use unlicensed CCs as secondary cells (SCells). Note that SCells that operate on unlicensed bands may be referred to as "LAA SCells," for example.

While research is in progress to transmit UCI in LAA SCells, there is an on-going discussion as to which cells' UCI is to be transmitted in LAA SCells. For example, one idea under discussion is not to transmit HARQ-ACKs pertaining to licensed CCs in the UL for LAA SCells. This is because the throughput of licensed CCs will decrease if HARQ-ACKs pertaining to licensed CCs cannot be sent due to "$LBT_{busy}$" and/or the like.

Also, a study is conducted to allow HARQ-ACKs and CSIs for unlicensed CCs to be transmitted in the UL of LAA SCells. This is to prevent the primary cell (PCell) of licensed CCs from entering the overload state with a large amount of UCI.

It is not yet decided whether PUCCH can be used when UCI, or even a part of UCI, is transmitted in unlicensed CCs, but it is necessary to decide how to send UCI both when PUCCH is supported and when PUCCH is not supported. In any case, it may be possible to re-use part of existing UCI transmission control methods.

One existing UCI transmission control method is a method to use PUCCH groups. With the PUCCH groups used in DC, eCA (enhanced CA) and so on, up to two PUCCH groups are configured in a UE. It is possible to configure one PUCCH cell in each group. A PUCCH cell refers to a cell that is configured to transmit PUCCH. The UCI for CCs in a given group can be transmitted in the PUCCH, using the same group's PUCCH cell. Note that the PUCCH cell is not limited to PCell.

Another existing method for controlling UCI transmission is simultaneous transmission of PUCCH and PUSCH. For example, a UE where simultaneous transmission of PUCCH and PUSCH (hereinafter referred to as "PUCCH+PUSCH simultaneous transmission") is configured (configured "true") can transmit HARQ-ACKs in PUCCH and CSI in PUSCH, at the same time. Note that periodic CSI (P-CSI) may be reported in the cell with the smallest cell index (for example, an SCell index) among the cells where PUSCH is allocated, and aperiodic CSI (A-CSI) may be reported in triggered cells.

For example, if PUCCH can be used in LAA SCells, it may be possible to re-use existing concepts related to the design of PUCCH groups. In this case, it may be possible to configure a PUCCH group consisting only of licensed CCs and a PUCCH group consisting only of unlicensed CCs, and transmit the UCI for each PUCCH group in the PUCCH cells of that group. Note that PUCCH+PUSCH simultaneous transmission may be configured per PUCCH group, individually. Furthermore, the PUCCH groups may be referred to as "cell groups."

However, in this case, in the unlicensed CCs, whether or not PUCCH and/or PUSCH can be transmitted changes depending on what result LBT indicates, and therefore how to define the UCI transmission operation in the PUCCH group of unlicensed CCs raises a problem.

Meanwhile, if PUCCH cannot be used in LAA SCells, how to specify the UCI transmission operation in each CC, taking into account the constraints of PUCCH+PUSCH simultaneous transmission, LBT and so on, poses a problem. The reasons that PUCCH cannot be used in LAA SCell may include, for example, that PUCCH is not supported in the specification, that PUCCH is not configured because PUCCH+PUSCH simultaneous transmission leads to a power-limited state and makes it difficult to achieve sufficient quality, and so on.

Also, although PUCCH+PUSCH simultaneous transmission between different cells is already supported in licensed CCs, the operation in unlicensed CCs has not been studied.

So, the present inventors have come up with the idea of clearly defining the UCI transmission operation (transmission control) in LAA SCells, both when PUCCH is used and when PUSCH is used.

To do so, the present inventors have first started out with the idea of configuring whether or not PUCCH transmission in LAA SCells is possible via RRC (Radio Resource Control) signaling. In addition, assuming the case where PUCCH transmission is configured, the present inventors have come up with the idea of specifying separate UE operations depending on whether or not PUCCH+PUCCH simultaneous transmission is possible. In addition, the present inventors have come up with the idea of defining UE operations in multiple different UCI transmission modes when PUCCH transmission is not configured, so that eNB can configure the UCI transmission mode for the UE.

Now, embodiments of the present invention will be described in detail below with reference to the accompanying drawings. For each embodiment, a UE will be described to perform UL-LBT in LAA SCells, but this is not limiting.

Also, although each embodiment will be described on the assumption that CA is applied to PCell that is a license cell and SCell that is an unlicensed cell, but this is not limiting.

That is, in each embodiment, the structure in which licensed carriers are regarded as carriers where listening (LBT) is not configured (which may be referred to as "carriers where LBT is not executed," "carriers where LBT cannot be executed," "non-LBT carriers," etc.), and the structure in which unlicensed carriers are regarded as carriers where listening (LBT) is configured (which may be referred to as "carriers where LBT is executed", "carriers where LBT should be executed", "LBT carriers," etc.) also constitute embodiments of the present invention.

Also, the combinations of carriers where LBT is not configured and carriers where LBT is configured, and PCell and SCells are not limited to those given above. For example, the present invention can be applied to the case where a UE connects with an unlicensed band in stand-alone (when PCell and SCells are all carriers where LBT is configured), and so on.

Radio Communication Method

First Embodiment

According to the first embodiment of the present invention, a UE reports information as to whether or not the UE supports transmission in PUCCH format (PF: PUCCH Format) 4 and/or 5 (whether or not to support PF 4/5) in LAA SCells, to the network side (for example, eNB), as terminal capability information (UE capability).

This capability information here may be reported using one or a combination of the following: (1) Existing UE capability information bits (capability bits) to indicate that PF 4/5 are supported (these bits may be included and reported in, for example, PhyLayerParameters-v13x0, which is specified as a parameter for LTE Rel. 13); (2) New UE capability information bits to indicate that PF 4/5 are supported in LAA SCells (these bits may be included, for example, in PhyLayerParameters-v14x0, which is defined as a parameter for LTE Rel. 14, and reported as UL-LAA-specific information); (3) L-LAA UE capability information, including capability information to indicate that PF 4/5 are supported in LAA SCells (for example, included and reported in, for example, supportOfLAA-r14 specified as a parameter for LTE Rel. 14).

Note that above (3) means that a UE that supports UL-LAA always supports PF 4/5 in LAA SCells.

Also, the eNB may configure information as to whether to use PUCCH in a given LAA SCell—that is, information about whether or not a given LAA SCell is a PUCCH cell (PUCCH cell configuration information—in the UE via higher layer signaling (for example, RRC signaling). For example, whether or not an LAA SCell is a PUCCH cell may be included in the information that is used to identify the UE-specific physical channel configuration related to the SCell (PhysicalConfigDedicatedSCell-r10), in the form of pucch-Cell-r14, which is defined as a parameter for LTE Rel. 14, and reported to the UE.

The PUCCH cell configuration information can also be seen as information to indicate whether or not a given cell is a PUCCH-transmitting cell. Note that, when at least one of the above-described types of UE capability information is received from a predetermined UE, the eNB may report PUCCH cell configuration information to the UE.

According to the first embodiment described above, the eNB can preferably controls the PUCCH configuration in LAA SCells based on UE capability information transmitted from the UE.

Note that, although the first embodiment has been described so that, when UCI for an LAA SCell is transmitted in PUCCH, whether or not PUCCH transmission is supported in the LAA SCell is reported by using UE capability information that indicates whether PF 4/5 are supported in the LAA SCell, on the assumption that only PF 4/5 are used as PUCCH formats, but this is by no means limiting.

For example, when a predetermined PF (for example, PF 2) other than PF 4/5 is used in an LAA SCell, whether or not PUCCH transmission is supported in the LAA SCell may be reported by using UE capability information that indicates whether or not this predetermined PF is supported in the LAA SCell. In addition, information as to whether or not PUCCH transmission is supported in the LAA SCell may be directly included and reported in the UE capability information. In this case, when the eNB receives this information from a predetermined UE, the eNB may perform control assuming that the UE supports PF 4/5.

Second Embodiment

In the second embodiment of the present invention, the UE operation in the case where PUCCH transmission (PUCCH on LAA SCell) is configured in LAA SCells will be defined. Below, the second embodiment will be roughly divided into two cases—namely, the case where PUCCH+PUSCH simultaneous transmission is not possible (configured "false") (embodiment 2.1) and the case where PUCCH+PUSCH simultaneous transmission is possible (configured "true") (embodiment 2.2)—and each case will be described. Information as to whether or not simultaneous PUCCH+PUSCH transmission is possible can be reported (configured) to a UE through higher layer signaling (for example, RRC signaling).

In the second embodiment, as mentioned earlier, a PUCCH group consisting only of licensed CCs and a PUCCH group consisting only of unlicensed CCs are provided, and, when the UCI for each PUCCH group is transmitted in PUCCH, it is transmitted in the PUCCH cells of that group. However, the UCI transmission control according to the second embodiment can be applied even if another CC configuration and/or group configuration is configured in the UE.

In the following description, only the UCI transmission operation related to the PUCCH group (cell group) including unlicensed CCs will be described, and the description of the PUCCH group including licensed CCs will be omitted.

Embodiment 2.1

FIG. 1 is a diagram to explain the UCI transmission operation according to embodiment 2.1. FIG. 1 illustrates three LAA SCells. "PUCCH SCell" is an LAA SCell that is capable of PUCCH transmission (configured as a PUCCH cell). "LAA SCell$_i$," and "LAA SCell$_{i+1}$" are LAA SCells that cannot perform PUCCH transmission (not configured as PUCCH cells). Assume that the SCell index of LAA SCell$_i$ is smaller than that of either LAA SCell$_{i+1}$ or the PUCCH SCell. Note that application of this embodiment is not limited to the case where a UE uses three LAA SCells.

In FIG. 1, a UE executes listening in the CCA period before transmitting UL signals in each SCell, and, upon judging that the channel is idle, the UE carries out UL transmission. In addition, periods $t_{11}$ to $t_{14}$ illustrated in FIG. 1 are simply exemplary periods for explaining the UCI transmission operation, and the order these periods occur, the length of these periods and so on are not limited.

At a timing (for example, a TTI) where PUSCH is not scheduled in either LAA SCell, the UCI for all of the unlicensed CCs (in the PUCCH group) (including A/N, CSI (P-CSI, A-CSI, etc.), SR and others) is transmitted (exemplified at $t_{11}$) in the PUCCHs of the LAA SCells based on LBT (PUCCH on LAA SCell). However, A-CSI for SCells other than the PUCCH SCell may not be transmitted in the PUCCH SCell.

Note that, referring to FIG. 1, UCI that needs not be transmitted may not be transmitted even if it is illustrated in the drawing. For example, at $t_{11}$, at least one of A/N, CSI (P-CSI, A-CSI, etc.) and SR may be transmitted. The same applies to the other UCIs illustrated in the drawing, and the same applies to the subsequent drawings.

The UE shall transmit PUCCH in PF 4/5 in the LAA SCells, but other PFs may be used as well. Note that at a timing where only one P-CSI is transmitted in PUCCH, the UE may transmit this one P-CSI in accordance with PF 4 and/or 5, or transmit this one P-CSI in accordance with an existing PF (for example, PF 2).

At a timing where PUSCH is scheduled in LAA SCells and A/N and/or P-CSI is triggered (A/N and/or P-CSI is transmitted), the UE transmits A/N and/or P-CSI based on LBT, in the PUSCH of a particular cell among the LAA SCells that are scheduled (exemplified at $t_{12}$). In this case, the UE tries to transmit UCI only in one of the LAA SCells that are scheduled, so that the efficiency of the use of resources can be improved by not transmitting redundant UCIs. At $t_{12}$, the UE uses LAA SCell, as the specific cell.

Here, the specific cell may be, for example, the cell where a predetermined cell-related indicator is the smallest among the LAA SCells that are scheduled. The predetermined indicator may be a cell ID (cell identity), a physical cell ID, a virtual cell ID, a cell index (for example, an SCell index, an index that is unique to LAA SCells, etc.), or other indicators.

Also, at a timing where PUSCH is scheduled in LAA SCells and A/N and/or P-CSI are triggered, the UE transmits A/N and/or P-CSI based on LBT in the PUSCHs of all the scheduled LAA SCells (exemplified at $t_{13}$). In this case, the UE can try transmitting UCI of the same contents in all of the LAA SCells that are scheduled, so that the possibility that the UE will successfully transmit the UCI can be improved.

Also, at a timing where PUSCH is scheduled in a predetermined LAA SCell and A-CSI is triggered (A-CSI is transmitted) in this LAA SCell, the UE transmits A-CSI based on LTB, in the PUSCH of this LAA SCell (exemplified at $t_{14}$). In this case, the A-CSI is transmitted only in the A-CSI-triggered cell, so that the communication overhead related to the reporting of A-CSI can be distributed over each cell. In addition, when having A/N that should be transmitted, the UE may transmit (piggyback) the A-CSI and the A/N together.

Embodiment 2.2

Figure 2:
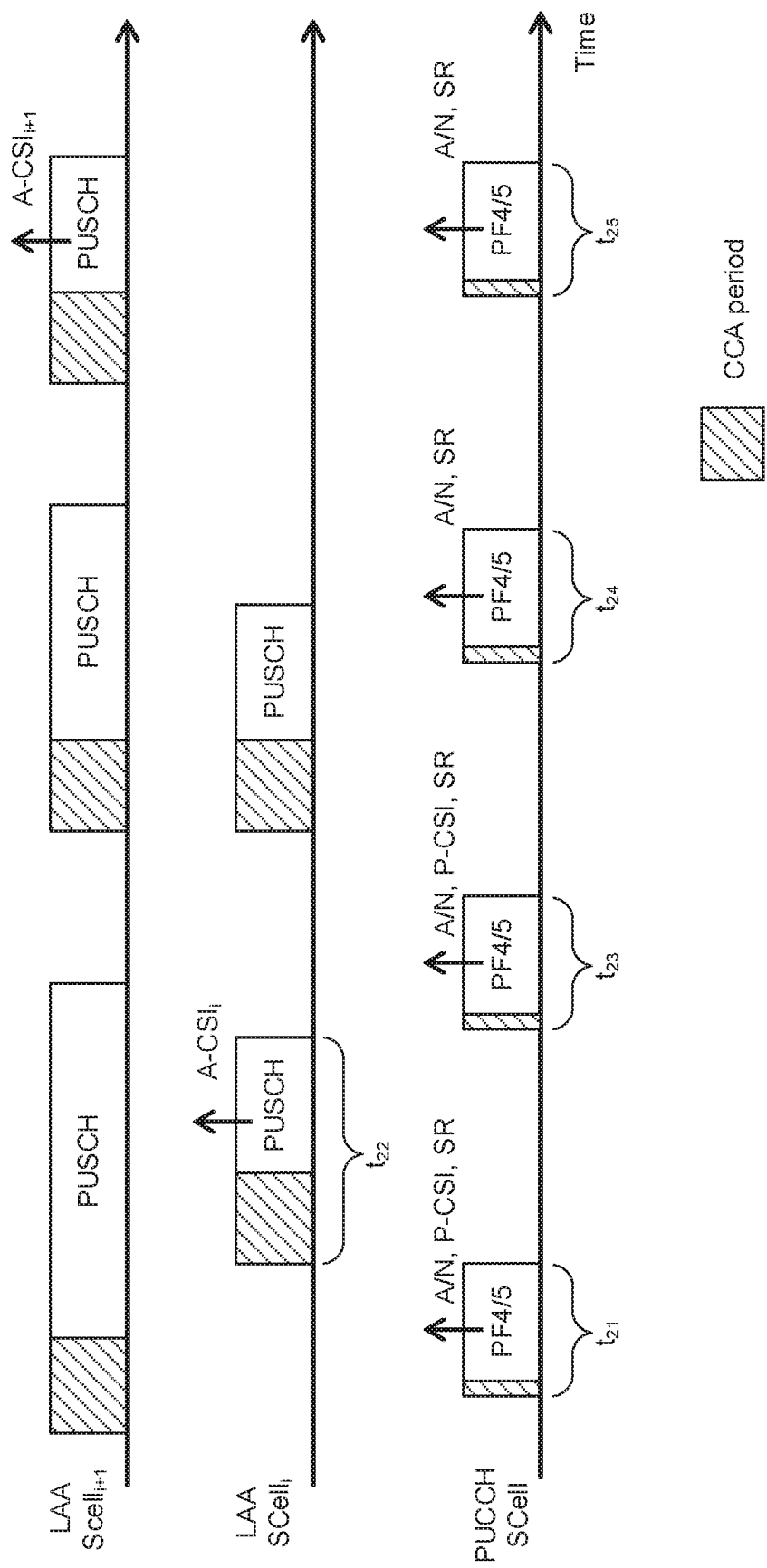
FIG. 2 is a diagram to explain the UCI transmission operation according to embodiment 2.2.

FIG. 2 is a diagram to explain the UCI transmission operation according to embodiment 2.2. FIG. 2 illustrates a similar example to FIG. 1.

At a timing where at least one of A/N, P-CSI and SR should be transmitted (for example, TTI), the UE transmits the UCI based on the LBT in the PUCCH on the LAA SCell (PUCCH SCell) (illustrated as $t_{21}$, $t_{23}$, $t_{24}$ and $t_{25}$).

FIG. 2 illustrates an example in which the UE transmits PUCCH in PF 4/5 in LAA SCells, but different PFs may be used as well. Note that at a timing where only one P-CSI is transmitted in PUCCH, the UE may transmit this one P-CSI in PF 4 and/or 5, or transmit this one P-CSI in an existing PF (for example, PF 2).

At a timing where A-CSI is triggered (A-CSI is transmitted), the UE transmits A-CSI based on LBT using the PUSCH of the triggered cell (exemplified at $t_{22}$ and $t_{25}$). For example, at $t_{22}$, A-CSI (A-CSI$_i$) for LAA SCell$_i$ is transmitted in LAA SCell$_i$.

Alternative Example of Second Embodiment

When UCI is transmitted in an unlicensed CC, there is a possibility that LBT fails (the result of LBT indicates "busy") and a delay is produced before PUCCH and/or PUSCH are transmitted. When transmission of UCI is delayed and the UCI that is already generated is immediately discarded, unnecessary UCI generation processing might take place in the UE, and the processing load in the UE may increase.

So, the UE may retain the UCI for a predetermined period (which may be referred to as "UCI retention period," "PUCCH-related UCI retention period," etc.). By this means, the UE can transmit all the UCI that has been retained, at the time LBT succeeds (the result of LBT indicates "free"). For example, UCI may be retained by storing UCI in a predetermined buffer area.

The UCI retention period may be defined as a period, which starts from the time resource of a PUCCH that may be able to transmit given UCI first (for example, TTI), and in which this UCI can be transmitted in the PUCCH. Also, the UCI retention period may be defined with a fixed value in advance in the specification, or may be reported from the eNB by using higher layer signaling (for example, RRC signaling, broadcast information (MIB (Master Information Block), SIB (System Information Block), etc.), physical layer signaling (for example, downlink control information (DCI)), or a combination of these.

Note that, once UCI is successfully transmitted, the UCI discards this UCI even during the UCI retention period. Meanwhile, even after UCI is successfully transmitted, the UE may retain this UCI during the UCI retention period.

Figure 3:
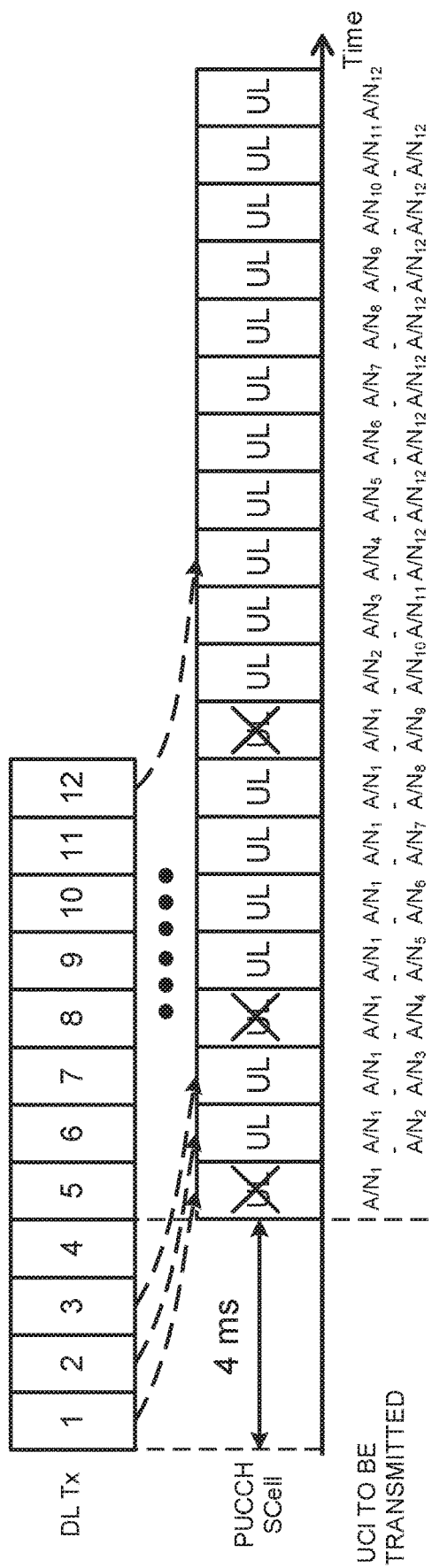
FIG. 3 is a diagram to illustrate an example of the UCI retention operation according to an alternative example of a second embodiment.

FIG. 3 is a diagram to illustrate an example of the UCI retention operation according to an alternative example of the second embodiment. FIG. 3 illustrates downlink signals (DL Tx) received in a UE, uplink resources for a PUCCH SCell and UCIs (A/N) that are transmitted. FIG. 3 assumes a TTI duration of 1 ms, but the TTI duration is not limited to this.

In FIG. 3, the UE receives downlink signals (downlink data) in twelve consecutive TTIs. an A/N (A/N$_j$) is generated in response to the receipt of a downlink signal in the j-th TTI, and retained. In this way, every time the UE receives a downlink signal, the UE generates an A/N in response, and retains this. In FIG. 3, the UCI retention period (X) is configured to 9 ms. Consequently, each $A/N_j$ is discarded after it is retained for 9 ms. That is, it is possible to say that the maximum number of UCIs (A/Ns) that can be retained in the buffer is the value given by dividing the UCI retention period by the TTI duration.

The UE performs LBT-based UL transmission (including UCI transmission) using PUCCH, in an XSCell, a predetermined period of time (for example, 4 ms) after downlink data is received. Note that, since the "UCI to be transmitted" cannot be transmitted depending on the result of LBT (for example, in TTIs where "X" overlaps "UL" in the drawing), there are cases where "UCI scheduled to be transmitted" is indicated. According to this example, even after UCI is successfully transmitted, the UCI is retained during the UCI retention period, and transmission continues during the retention period.

In this example, the UE can transmit UCI as long as the UCI retention period (X) continues, and therefore the possibility that each UCI can transmit each UCI in an LAA SCell (XSCell) can be improved.

Note that, although FIG. 3 illustrates an example in which UCI is transmitted in PUCCH, this is not limiting. For example, even when the UE transmits UCI in PUSCH, or transmits UCI in PUCCH and in PUSCH, the UE may likewise control the UCI transmission process based on the UCI retention period.

Also, the UCI retention period may be configured/specified individually for each type of UCI. For example, the UCI retention period for A/Ns, the UCI retention period for P-CSI, the UCI retention period for A-CSI and the UCI retention for the SR period may be configured/defined differently, or may be configured/defined the same.

Third Embodiment

A third embodiment of the present invention will define the UE operation in the case where PUCCH transmission is not configured in an LAA SCell (PUCCH on LAA SCell).

In the third embodiment, a plurality of UCI transmission modes (UCI Tx (Transmission) modes) will be defined, which are used to specify whether to transmit the UCI of each CC in a licensed carrier or an unlicensed carrier. Then, the eNB configures (reports) based on which UCI transmission mode the UE should perform transmission control, via higher layer signaling (for example, RRC signaling), physical layer signaling (for example, DCI), or a combination of these.

FIG. 4 is a diagram to illustrate examples of UCI transmission modes according to the third embodiment. UCI transmission mode 0 is a mode of sending all the UCI related to the unlicensed CC in the licensed CC. In UCI transmission mode 1, only the A-CSI related to the unlicensed CC is sent in the unlicensed CC, and the rest of the UCI is sent in the licensed CC. In UCI transmission mode 2, CSI (P-CSI and A-CSI) related to the unlicensed CC is sent in the unlicensed CC, and the A/N related to the unlicensed CC is sent in the licensed CC. UCI transmission mode 3 is a mode of sending all the UCI related to the unlicensed CC in the unlicensed CC.

Although not illustrated in FIG. 4, an SR pertaining to the unlicensed CC may be transmitted, for example, in the CC where an A/N for the unlicensed CC is transmitted, may be transmitted in the licensed CC at all times, or may be transmitted in the CC where the rest of the UCI is transmitted.

Hereinafter, points of each transmission mode according to the third embodiment that are of particular importance will be described in detail. Transmission control for UCI not specifically mentioned in each transmission mode may be the same as the transmission control in eCA of LTE Rel. 13.

Note that FIGS. 5A, 5B, 6A, 6B, 7A, and 7B, which will be used in the following description, illustrate a PCell, which is a licensed CC, and a licensed SCell$_n$, LAA SCell$_i$ (and LAA SCell$_{i+1}$), which is an unlicensed CC, and uplink signals for each cell. LAA SCell$_i$ is the cell with the smallest SCell index among LAA SCells. Note that PCell can also be referred to as the PUCCH cell of licensed carriers.

[UCI Transmission Mode 0]

In UCI transmission mode 0, in which in licensed CC A-CSI relating to an unlicensed CC is to be transmitted may be defined in the specification in advance, or may be configured in the UE via RRC signaling and so on.

[UCI Transmission Mode 1]

FIGS. 5A and 5B provide diagrams to illustrate examples of transmission control according to UCI transmission mode 1. In UCI transmission mode 1, where PUCCH+PUSCH simultaneous transmission is not possible, at a timing where PUSCH is scheduled only in the unlicensed CC, the UE drops the P-CSI for the unlicensed CC (FIG. 5A). FIG. 5A illustrates an example of dropping the P-CSI (P-CSI$_i$) for LAA SCell$_i$ at a timing where PUSCH is scheduled only in LAA SCell$_i$.

Also, in UCI transmission mode 1 where PUCCH+PUSCH simultaneous transmission is not possible, at a timing where PUSCH is scheduled only in the unlicensed CC and PF 3 is used in the PCell, the UE drops the P-CSI for the unlicensed CC (FIG. 5B).

Note that, in UCI transmission mode 1, as illustrated in FIGS. 5A and 5B, at a timing where PUSCH is scheduled in the licensed CC, the UE can transmit the P-CSI for the unlicensed CC in the PUSCH of the licensed CC.

[UCI Transmission Mode 2]

In UCI transmission mode 2, the UE may transmit P-CSI pertaining to the unlicensed CC only in the PUSCH of a specific cell or in the PUSCHs of all the LAA SCells that are scheduled. Here, the specific cell may be, for example, the cell where a predetermined cell-related indicator is the smallest among the LAA SCells scheduled. The predetermined indicator may be a cell ID, a physical cell ID, a virtual cell ID, a cell index (for example, an SCell index, an index that is unique to LAA SCells, etc.), or other indicators.

FIGS. 6A and 6B provide diagrams to illustrate examples of transmission control in accordance with UCI transmission mode 2. FIG. 6A illustrates a case where PUCCH+PUSCH simultaneous transmission is not possible, and FIG. 6B illustrates a case where PUCCH+PUSCH simultaneous transmission is possible. In FIGS. 6A and 6B, regardless of whether or not PUCCH+PUSCH simultaneous transmission is possible, P-CSI for all unlicensed CCs is transmitted in the PUSCH of LAA SCell$_i$.

[UCI Transmission Mode 3]

In UCI transmission mode 3, the UE controls the transmission of UCI using a newly defined operation. First, one specific LAA SCell is selected as a special LAA SCell for transmitting UCI. This special LAA SCell may be referred to as "XSCell," for example.

The UE may select XSCell and report information that represents this XSCell to the eNB. The report may be sent, for example, via higher layer signaling (for example, RRC signaling), physical layer signaling (UCI), or a combination of these. The UE may select XSCell based on the history of LBT results, for example.

Also, the eNB may select XSCell and report information that represents this XSCell to the UE. The report may be sent, for example, via higher layer signaling (for example, RRC signaling), physical layer signaling (for example, DCI such as a UL grant), or a combination of these.

The eNB may select XSCell using or based on, for example, one or a combination of following (a) to (d):
 (a) uniform and random selection;
 (b) A/Ns for each carrier;
 (c) history of UL-LBT results reported from the UE; and
 (d) when type-B multicarrier LBT is used for UL-LBT, a CC that is selected to implement LBT category 4 (LBT to which random backoff is applied) and XSCell are associated.

The UE transmits A/Ns and/or P-CSI for the unlicensed CC only in the PUSCH of XSCell based on LBT. Here, if PUCCH+PUSCH simultaneous transmission is not possible, the UE transmits the UCI (A/Ns and/or P-CSI) in the unlicensed CC only at timings where there is no PUCCH transmission in the licensed CC. On the other hand, if PUCCH+PUSCH simultaneous transmission is possible, the UE transmits the UCI in the unlicensed CC, regardless of the licensed CC.

Figures 7A, 7B:
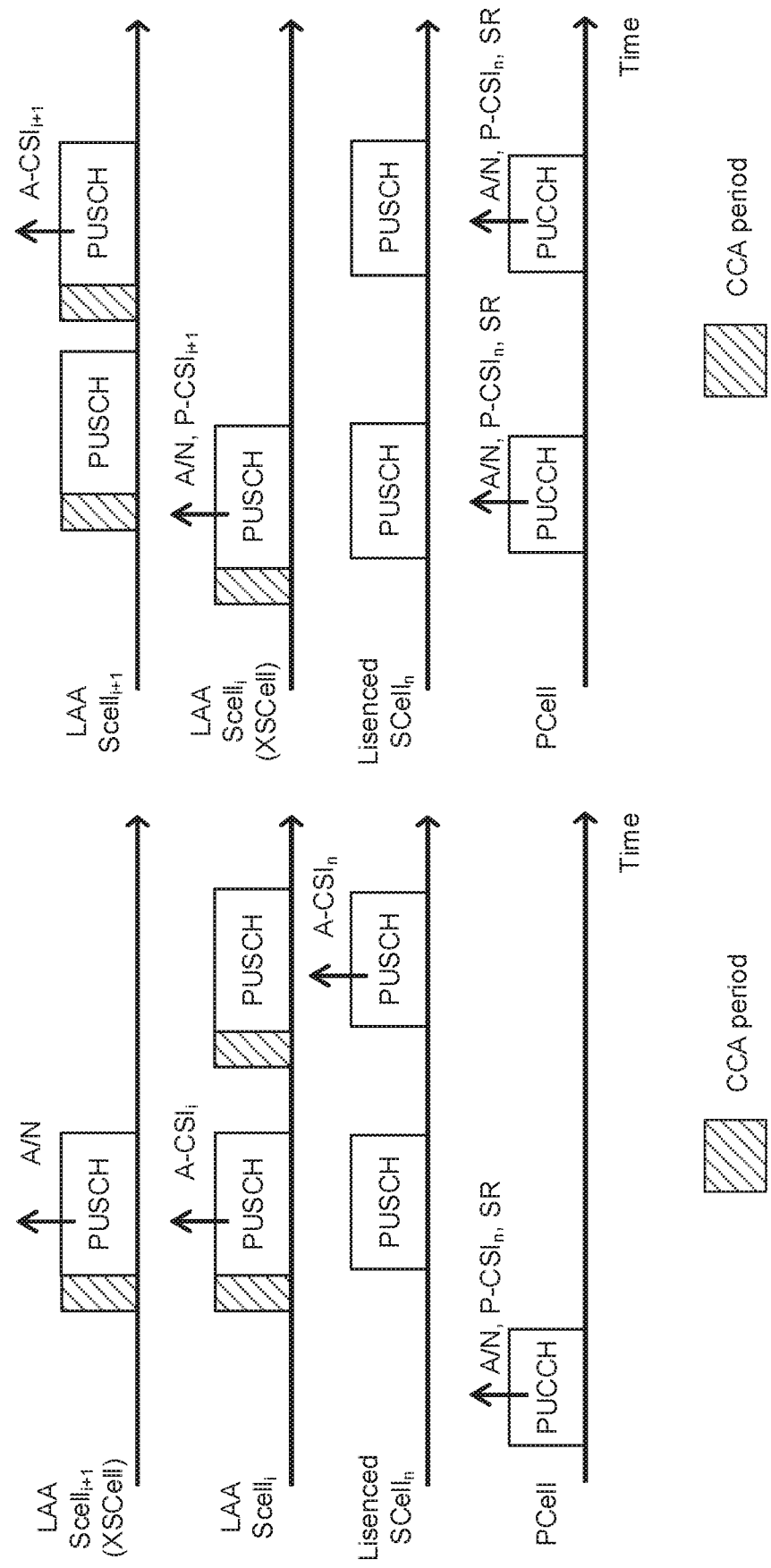
FIGS. 7A and 7B are diagrams to illustrate examples of transmission control in UCI transmission mode 3.

FIGS. 7A and 7B provide diagrams, illustrating examples of transmission control according to UCI transmission mode 3. FIG. 7A illustrates a case where PUCCH+PUSCH simultaneous transmission is not possible, and FIG. 7B illustrates a case where PUCCH+PUSCH simultaneous transmission is possible. XSCell is LAA SCell$_i$ in FIG. 7A and LAA SCell$_{i+1}$ in FIG. 7B.

In FIG. 7A, at a timing where there is no PUCCH transmission in the licensed CC, the unlicensed CC's A/N is transmitted in XSCell, and this cell's A-CSI (A-CSI$_i$) of the cell is transmitted in LAA SCell$_i$. Note that the UE gives priority to PUCCH at a timing where there is PUCCH transmission in the licensed CC.

In FIG. 7B, the UE transmits the UCI of the licensed CC in the licensed CC (PCell or PUCCH cell) and transmits A/N and P-CSI for the unlicensed CC in the PUSCH of XSCell. The UE transmits the unlicensed CC's A-CSI in a measurement-triggered cell.

In UCI transmission mode 3, the UE may retain the UCI (for example, A/N and P-CSI) for the unlicensed CC for a predetermined period (which may be referred to as "UCI retention period (time window for UCI retention)," "first retention period (first UCI retention period related to PUSCH)," and so on). When the opportunity to transmit PUSCH arrives during the first retention period, the UE transmits all the UCI that has been retained all together. Meanwhile, the UE discards the UCI that has passed the first retention period.

The first retention period may be defined as a period in which transmission of certain UCI (for example, A/N bit) in PUSCH is valid. Also, the first retention period may be pre-defined in the specification using fixed values, or may be reported from the eNB by higher layer signaling (for example, RRC signaling), physical layer signaling (DCI such as a DL grant), or a combination of these.

Note that the UE retains an A/N during the first retention period, even when no uplink resource-scheduling UL grant is received. The first retention period may start from the first time resource (for example, TTI) of XSCell's PUSCH where UCI may be transmitted, or start from the TTI where given UCI is generated (for example, a TTI where a DL signal is received).

Also, even when a UL grant is received, there is a possibility that LBT will fail and UCI transmission will be delayed. Therefore, in UCI transmission mode 3, the UE may retain the UCI (for example, A/N and P-CSI) for the unlicensed CC for a predetermined period (also referred to as "time window for UCI transmission," "second retention period (second UCI retention period on PUSCH)," etc.), which is different from the above-mentioned UCI retention period.

The second retention period may be defined as a period which starts from the first time resource (for example, TTI) of XSCell's PUSCH where given UCI may be transmitted, and in which this UCI can be transmitted in XSCell's PUSCH. Also, the second retention period may be pre-defined in the specification using fixed values, or may be reported from the eNB by higher layer signaling (for example, RRC signaling), physical layer signaling (DCI such as a DL grant), or a combination of these.

Note that, as for the retention period for predetermined UCI (for example, A/N), the one with the larger value between the first retention period (for example, Y ms) and the second retention period (for example, X ms) may be used, or it is equally possible to use the retention period until a UL grant is received as the first retention period, and use the retention period after a UL grant is received (after a transmission starting timing based on the receipt of a UL grant) as the second retention period.

Furthermore, either the retention period until a UL grant is received or the retention period after a UL grant is received may be set as the first retention period (or second retention period). In this case, the UE may exert control so that, when a UL grant is received, the time that has passed since the retention of each retained UCI started is reset.

Note that, once UCI is transmitted successfully, the UE may discard this UCI even during the UCI retention period. On the other hand, even after UCI is transmitted successfully, the UE may retain this UCI during the UCI retention period.

Also, the UCI retention period, the first retention period, the second retention period and others may be individually configured/defined for each type of UCI.

Figure 8:
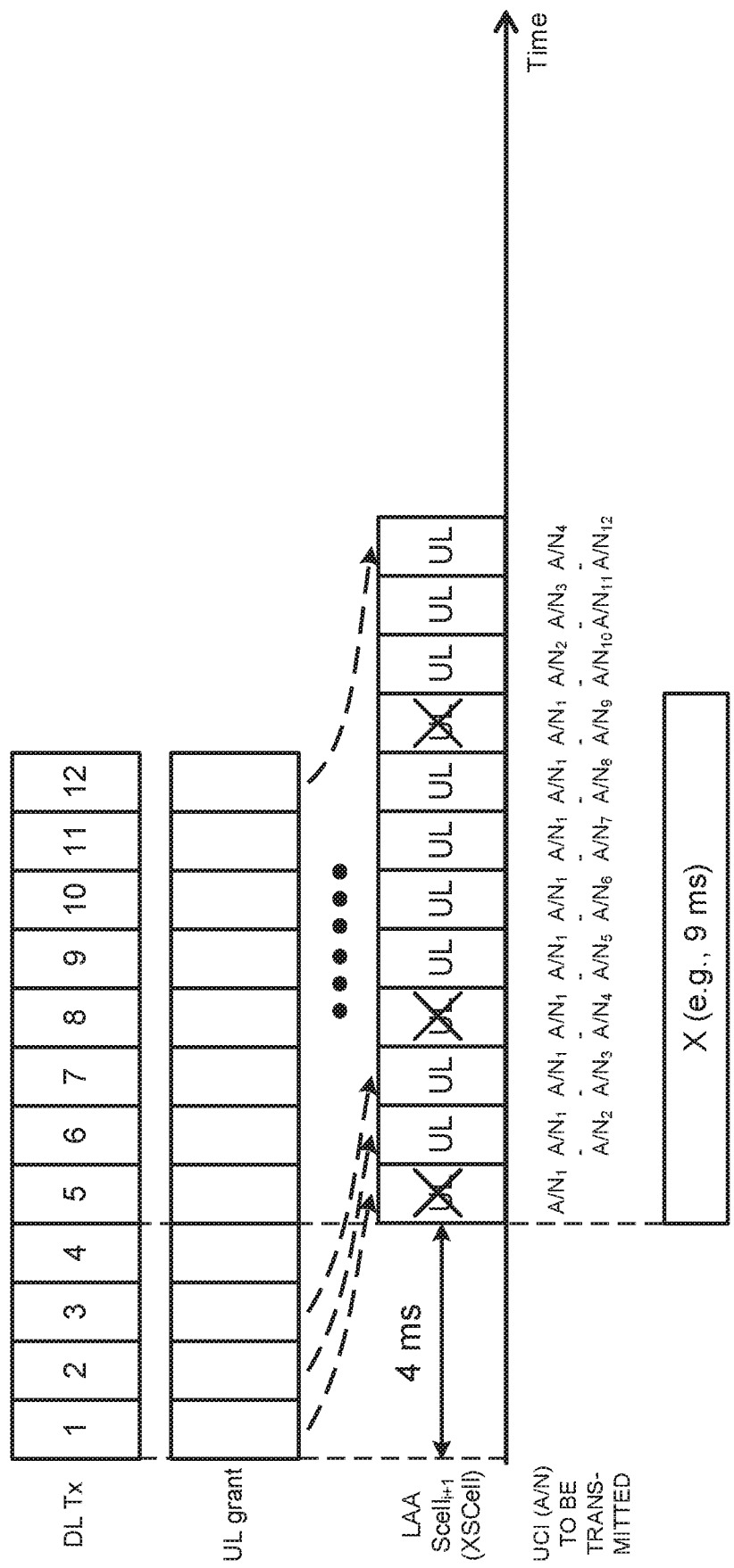
FIG. 8 is a diagram to illustrate an example of the UCI retention operation in UCI transmission mode 3 according to the third embodiment.

FIG. 8 is a diagram to illustrate an example of the UCI retention operation in UCI transmission mode 3 according to the third embodiment. FIG. 8 illustrates downlink signals (DL Tx) received by the UE, UL grants received by the UE, uplink resources for the PUSCH of XSCell, and UCIs (A/Ns) that are transmitted based on UL grants.

FIG. 8 assumes a TTI duration of 1 ms, but the TTI duration is not limited to this. The same applies to FIG. 9 and FIG. 10 below.

In FIG. 8, the UE receives downlink signals (downlink data) in twelve consecutive TTIs. an A/N (A/N$_j$) is generated in response to the receipt of a downlink signal in the j-th TTI, and retained. In this way, every time the UE receives a downlink signal, the UE generates an A/N in response, and retains this. In FIG. 8, the UCI retention period (X) is configured to 9 ms. Consequently, each A/N$_j$ is discarded after it is retained for 9 ms.

Also in FIG. 8, in TTIs where the UE receives downlink data, the UE also receives UL grants that schedule XSCell's uplink transmission. In FIG. 8, each UL grant schedules transmission of a transport block in one subframe (single-subframe scheduling).

The UE performs LBT-based UL transmission (including transmission of UCI) in XSCell a predetermined period of time (for example, 4 ms) after a UL grant is received. In this example, even UCI that has been successfully transmitted is retained during the UCI retention period. The same applies to the examples of FIG. 9 and FIG. 10.

In this example, the UE can transmit UCI as long as the UCI retention period (X) continues, so that the possibility that the UE can transmit each UCI can be improved.

Figure 9:
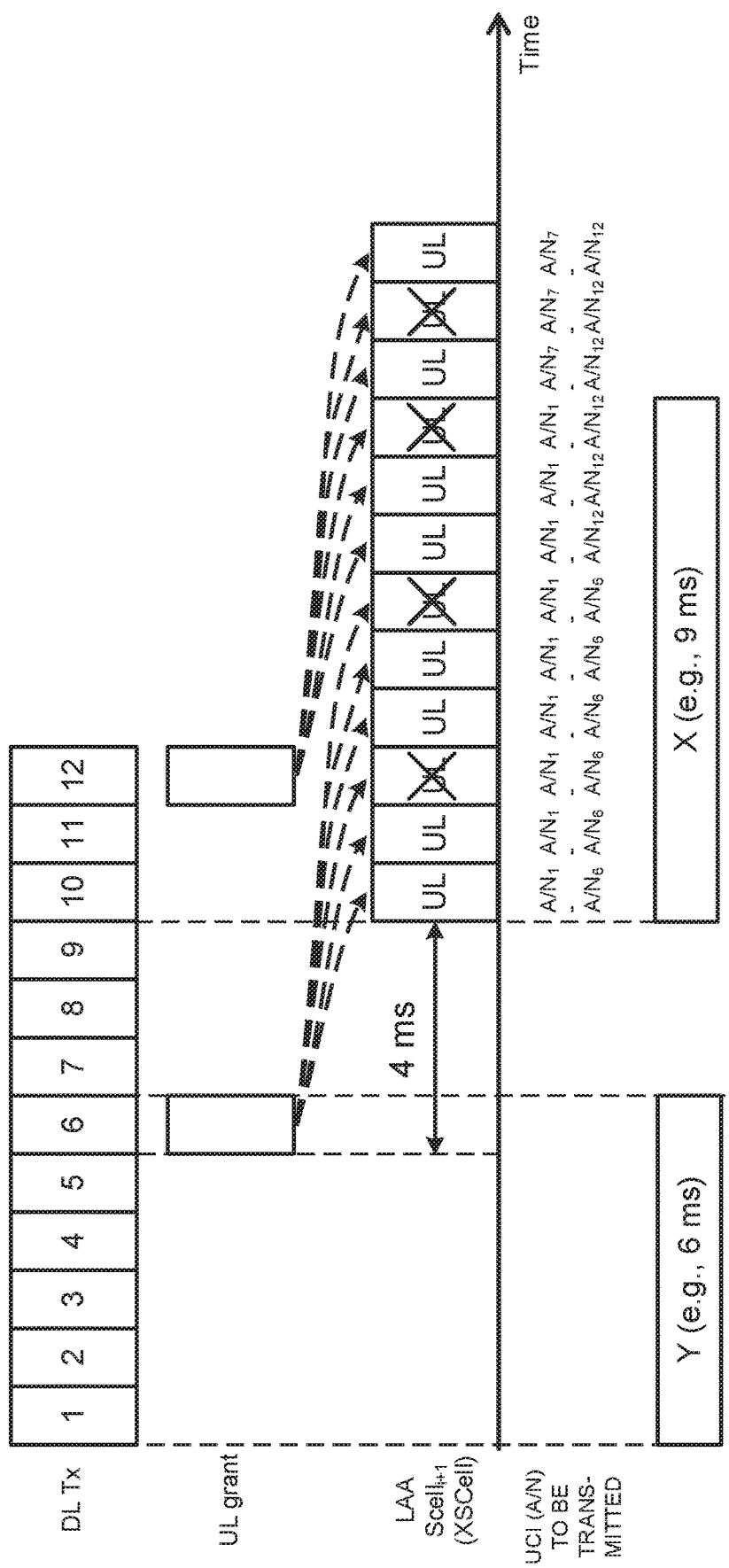
FIG. 9 is a diagram to illustrate another example of the UCI retention operation in UCI transmission mode 3 according to the third embodiment.

FIG. 9 is a diagram to illustrate another example of the UCI retention operation in UCI transmission mode 3 according to the third embodiment. FIG. 9 illustrates downlink signals (DL Tx) received by the UE, UL grants received by the UE, uplink resources for the PUSCH of XSCell, and UCIs (A/Ns) that are transmitted based on UL grants.

In FIG. 9, the UE receives downlink signals (downlink data) in twelve consecutive TTIs, as in the example of FIG. 8. In FIG. 9, the first retention period (Y) is configured to 6 ms, and the second retention period (X) is configured to 9 ms. Consequently, each $A/N_j$ is discarded after it is retained for 9 ms.

Furthermore, in FIG. 9, in the TTIs where the sixth and twelfth downlink signals are transmitted, UL grants are transmitted. In FIG. 9, each UL grant schedules the transmission of transport blocks in multiple subframes (multi-subframe scheduling).

In this example, a UL grant commands the transmission of UL subframes in a number of TTIs to match second retention period, so that it is possible to improve the possibility that the UE can transmit each UCI.

Figure 10:
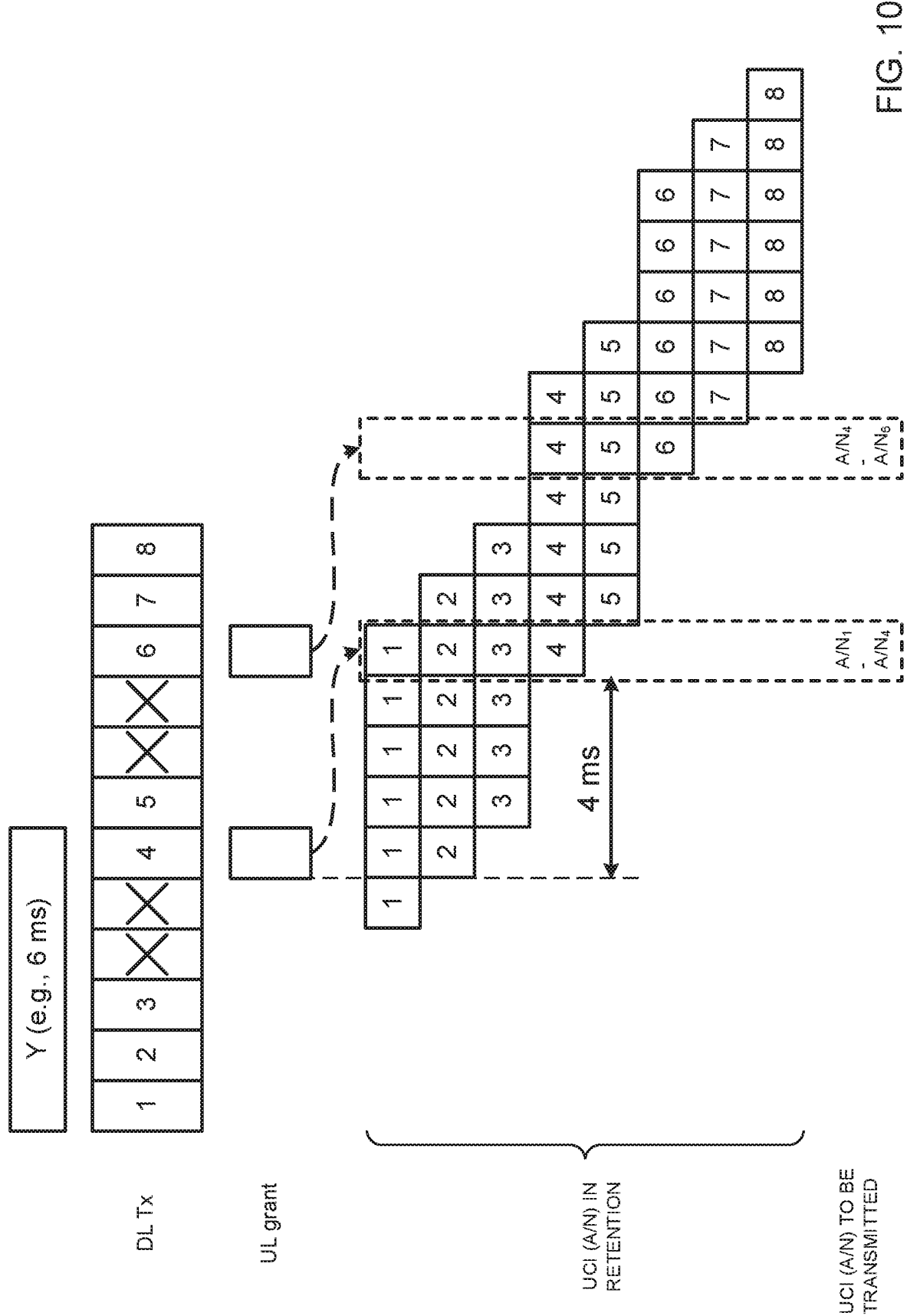
FIG. 10 is a diagram to illustrate yet another example of the UCI retention operation in UCI transmission mode 3 according to the third embodiment.

FIG. 10 is a diagram to illustrate yet another example of the UCI retention operation in UCI transmission mode 3 according to the third embodiment. FIG. 10 illustrates downlink signals (DL Tx) received by the UE, UL grants received by the UE, UCIs (A/Ns) that are retained for transmission (awaiting transmission), UCIs (A/Ns) that are transmitted based on UL grants.

FIG. 10 illustrates an example in which the eNB tries to transmit downlink signals (downlink data) in twelve consecutive TTIs, and in which the eNB nevertheless fails to transmit some of the downlink signals cannot be transmitted because the LBT result indicated a busy state. In FIG. 10, the first retention period (Y) is configured to 6 ms, and the second retention period (X) is not configured. Consequently, each $A/N_j$ is discarded when 6 ms pass without receiving a UL grant, or when 6 ms pass after transmission is ready.

At the transmission timing based on the first UL grant illustrated in FIG. 10, $A/N_1$ to $A/N_4$ are retained as UCIs that can be transmitted. Also, at the transmission timing based on the second UL grant illustrated in FIG. 10, $A/N_4$ to $A/N_6$ are retained.

As explained in this example, even when UL grants cannot be received, it is still possible to improve the possibility that the UE, where the first retention period (Y) is configured, can transmit each UCI.

Note that the UCIs to retain are not limited to A/N and P-CSI. For example, the transmission of at least one of A/N, P-CSI, A-CSI and SR may be controlled based on the first retention period and/or the second retention period.

[Control Signal for UCI Transmission Mode]

It may be possible to use a UL grant, a PDCCH that is transmitted in a common search space (common PDCCH) and so on, as a control signal for configuring the UCI transmission modes described in the third embedment in the UE.

For example, information about UCI transmission modes may be reported using a UL grant. As this information, for example, two-bit information to represent UCI transmission modes 0 to 3 may be used.

Furthermore, information for specifying the special LAA SCell (XSCell) for UCI transmission in UCI transmission mode 3 may be reported using a UL grant. For this information, information of a predetermined number of bits may be used (where the predetermined number is, for example, the number of LAA SCells, the maximum number of LAA SCells, etc.).

Furthermore, information about the first retention period and/or the second retention period in UCI transmission mode 3 may be reported in a common PDCCH (for example, DCI format 1C). The common PDCCH may be transmitted in the PCell, or may be transmitted in an SCell of a licensed CC and/or an LAA SCell.

Note that, in order to command these pieces of UCI mode-related control information, new fields may be set forth in DCI formats, or may replace existing fields (for example, the resource allocation field) and be used.

Fourth Embodiment

With a fourth embodiment of the present invention, the codebook size (also referred to as "CBS," "HARQ codebook size," etc.) for use when HARQ-ACK transmission is carried out in LAA SCells will be explained. Note that, although PUCCH transmission is not configured in LAA SCells (PUCCH on LAA SCell) in the case described below, UCI such as HARQ-ACK is transmitted in PUSCH. However, the present embodiment is not limited to this, and can also be applied to cases where PUCCH transmission is performed.

When sending HARQ-ACK in response to DL transmission, the user terminal transmits the HARQ-ACK in a predetermined codebook size (also referred to as "ACK/NACK bit sequence," "A/N bit size," etc.). In existing systems, the codebook size of HARQ-ACK (ACK/NACK bit sequence) to be transmitted in PUCCH is determined semi-statically based on information about the number of CCs reported by higher layer signaling.

When FDD is used, the overall A/N bit size is determined based on the number of CCs configured by RRC signaling, and based on TM (Transmission Mode), which indicates whether or not MIMO (Multiple Input Multiple Output) is applicable in each CC. In a given DL subframe, if a DL assignment is detected in at least one SCell, the user terminal feeds back A/Ns in response to all the CCs that are configured, in the UL subframe that comes a predetermined period later (for example, 4 ms later).

When TDD is used, in addition to the above case of using FDD, the overall size of the A/N bit sequence to transmit in PUCCH is determined based on the number of DL subframes that pertain to A/N per UL subframe.

Meanwhile, as mentioned above, when A/N transmission is controlled so that an A/N is retained for a predetermined period of time in LAA SCells, how to configure the codebook size is the problem. Since existing systems do not assume that A/Ns are retained, if existing methods are applied on an as-is basis, it may not be possible to configure the codebook size adequately. In this way, another problem which the present invention addresses is how to appropriately configure the codebook size when performing HARQ-ACK transmission in LAA SCells.

So, the present inventors have come up with the idea of determining the codebook size of HARQ-ACK by taking into account the retention period of A/Ns, when transmitting HARQ-ACK in LAA SCells. Hereinafter, the case where the codebook size is fixedly configured (fixed codebook size) and the case where the codebook size is dynamically configured (dynamic codebook size) when HARQ-ACK transmission is performed in LAA SCells will be described.

According to the fourth embodiment, the user terminal transmits A/Ns (retransmission control information) in response to downlink signals in LAA SCells (carriers where listening is performed before transmission). The user terminal configures the codebook size to use to transmit an A/N based on the time the user terminal retains this A/N.

[Fixed Codebook Size]

When using a fixed codebook size, the user terminal may configure a fixed codebook size based on the period the A/N is retained in the user terminal (A/N retention period). Here, the A/N retention period may be at least one of the period A/N is retained, starting from a TTI that is scheduled by a UL grant (second retention period (X)), and the period in which an A/N in response to a downlink signal is retained, starting from the TTI in which the downlink signal is received (first retention period (Y)).

The user terminal retains an A/N for the second retention period (X), which starts from a TTI scheduled by a UL grant. Therefore, even when the user terminal fails listening in this scheduled TTI, if the user terminal succeeds in listening in a subsequent TTI within the second retention period (X), the user terminal can transmit the A/N. After the second retention period (X) is over, the user terminal discards the A/N.

Also, the user terminal retains an A/N for the first retention period (Y) from a TTI in which a downlink signal is received. Consequently, even when the user terminal does not receive a UL grant in this TTI in which a downlink signal is received (downlink data, a downlink data channel (for example, PDSCH (Physical Downlink Shared Channel)), etc.), if the user terminal successfully receives a UL grant in a subsequent TTI within the first retention period (Y), the user terminal can transmit the A/N in the TTI scheduled by this UL grant. When the first retention period (Y) is over, the user terminal discards the A/N.

Note that, when the first retention period (Y) is equal to the TTI duration (for example 1 ms), this may be interpreted to mean that the first retention period (Y) is not configured. In this case, if the user terminal does not receive a UL grant in a TTI in which a downlink signal was received, the user terminal cannot transmit an A/N in response to the downlink signal.

Also, the user terminal may configure the fixed codebook size based on the number of CCs (cells), in addition to the above-described A/N retention period (at least one of the first retention period (Y) and the second retention period (X)). Here, the number of CCs has to be the number of cells (CCs) where A/Ns need to be transmitted in response to downlink signals, but is not limited to the number of LAA SCells or the number of CCs configured in the user terminal. Also, the number of CCs may be the number of CCs in a UCI cell group.

For example, the user terminal may configure a fixed codebook size based on following equation 1:

$$CBS = \lceil X/Y \rceil \cdot Y \cdot N \quad \text{(Equation 1)}$$

where X is the second retention period described above, Y is the first retention period described above, and N is the number of cells (CC) where A/Ns are generated in response to downlink signals. Note that equation 1 is simply an example, and this is by no means limiting. Various parameters that are not indicated in equation 1 may be taken into account.

Also, although above X, Y and N are configured via higher layer signaling, these may be specified through physical layer signaling, or determined by a combination of higher layer signaling and physical layer signaling. Also, the CBS itself may be configured via higher layer signaling, or may be specified through physical layer signaling.

Figure 17:
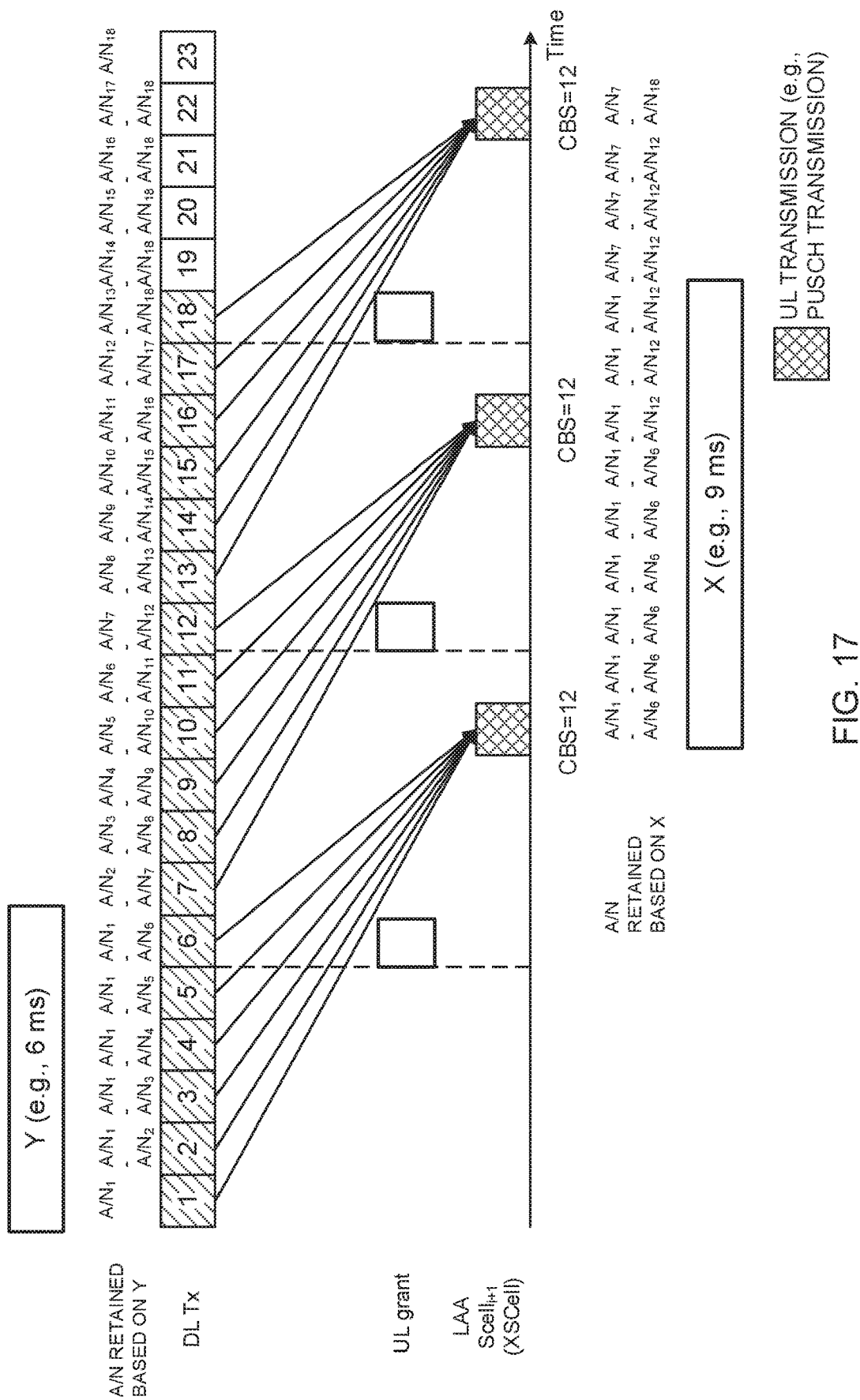
FIG. 17 is a diagram to illustrate an example of the method of determining the codebook size according to a fourth embodiment.

FIG. 17 is a diagram to illustrate an example of the method of determining the codebook size according to the fourth embodiment. FIG. 17 illustrates downlink signals (DL Tx) received by the UE, UL grants received by the UE, uplink resources for the PUSCH of XSCell, UCIs (A/Ns) that are transmitted based on UL grants, A/Ns retained in each TTI based on the first retention period (Y), and A/Ns retained in each TTI based on the second retention period (X).

In FIG. 17, the TTI duration is 1 ms, but the TTI duration is not limited to this. The same applies to FIG. 18 and FIG. 19 below. Furthermore, although, in FIG. 17, a UL grant schedules UL transmission in the TTI that comes four TTIs later, UL transmission to be scheduled by a UL grant is not limited to four TTIs later.

Also, although FIG. 17 illustrates a case of single-subframe scheduling, in which UL transmission is scheduled in a single subframe by a UL grant in a single subframe, multi-subframe scheduling can be applied as well, in which UL transmission is scheduled in a plurality of subframes by that UL grant.

Also, in FIG. 17, the first retention period (Y) is configured to 6 ms, and the second retention period (X) is configured to 9 ms. Note that the configuration values of the first retention period (Y) and the second retention period (X) are not limited to these. The configuration values of the first retention period (Y) and the second retention period (X) may each be n (n≥1) times the TTI duration. For example, if the first retention period (Y) is not configured (in the event control is exerted so that, unless a UL grant is received in a TTI in which a downlink signal is received, no A/N is transmitted in response to this downlink signal), Y=TTI duration (for example, 1 ms) may be used.

In addition, in FIG. 17, the number (N) of cells (CCs) where A/Ns are generated in response to downlink signals is configured to 1, but this is not limiting. In FIG. 17, the fixed codebook size determined using above equation 1 is 12 (=2·6·1).

In FIG. 17, the user terminal receives downlink signals (downlink data) in 18 consecutive TTIs. When a downlink signal is received in the j-th TTI, $A/N_j$ is generated in response to this downlink signal. The user terminal retains the generated $A/N_j$ for the first retention period (Y) (here, for 6 ms). For example, $A/N_1$ in response to the downlink signal of the first TTI is retained from the first TTI to the sixth TTI, and discarded if no UL grant is received by the sixth TTI.

Thus, $A/N_j$ in response to the downlink signal of the j-th TTI is retained from the j-th TTI to the j+(Y−1)-th TTI. $A/N_j$ is discarded unless a UL grant is received before the j+(Y−1)-th TTI. On the other hand, when a UL grant is received by the j+(Y−1)-th TTI, $A/N_j$ is transmitted using the PUSCH scheduled by this UL grant.

In FIG. 17, when a UL grant is received in the sixth TTI, $A/N_1$ to $A/N_6$ in response to the downlink signals of the first to sixth TTIs are retained based on the first retention period (Y), so that transmission of $A/N_1$ to $A/N_6$ is attempted in the tenth TTI scheduled by the UL grant. Meanwhile, the user terminal may not succeed in LBT in or immediately before the tenth TTI. So, the user terminal retains $A/N_1$ to $A/N_6$ for the second retention period (X) (here, for 9 ms) from the tenth TTI scheduled by the UL grant.

In FIG. 17, since LBT succeeds in or immediately before the tenth TTI, $A/N_1$ to $A/N_6$ are transmitted in this tenth TTI, using six bits out of the twelve bits of the codebook. In this case, the remaining six bits that are not used may be, for example, configured in default values (for example, NACK).

Also, at the time a UL grant is received in the twelfth TTI, $A/N_7$ to $A/N_{12}$ in response to the downlink signals of the seventh to twelfth TTI are retained based on the first retention period (Y). Furthermore, in the sixteenth TTI scheduled by the UL grant, in addition to $A/N_7$ to $A/N_{12}$ above, $A/N_1$ to $A/N_6$ in response to the downlink signals of the first to sixth TTIs are retained based on the second retention period (X). Therefore, in the sixteenth TTI, $A/N_1$ to $A/N_{12}$ are transmitted using all bits of the twelve-bit codebook.

Also, at the time a UL grant is received at the eighteenth TTI, $A/N_{13}$ to $A/N_{18}$ in response to the downlink signals of the thirteenth to eighteenth TTIs are retained based on the first retention period (Y). Furthermore, in the sixteenth TTI scheduled by the UL grant, in addition to $A/N_{13}$ to $A/N_{18}$ above, $A/N_7$ to $A/N_{12}$ in response to the downlink signals of the seventh to twelfth TTIs are retained based on the second retention period (X). Accordingly, in the twentieth TTI, $A/N_7$ to $A/N_{18}$ are transmitted using all bits of the twelve-bit codebook.

As described above, when the codebook size of each TTI is set in a fixed size that is equal to the maximum possible number of A/Ns, it is possible to simplify the control of the codebook size in the user terminal.

[Dynamic Codebook Size]

When dynamically changing the codebook size, the codebook size is determined taking the A/N retention period into account (for example, the second retention period (X)). For example, when UL transmission is performed in a given subframe (SF #n), the codebook size is controlled based on whether or not there is a UL subframe in a range of a predetermined period going backward from this SF #n. The UL subframe here refers to a UL subframe in which at least HARQ-ACK has been transmitted (including cases where transmission is not allowed due to LBT results). Also, the predetermined period can be a range that takes into account the A/N retention period (for example, X−1 or less). Of course, X−1 is not limiting.

The user terminal changes the codebook size depending on whether or not there is a UL subframe (for example, SF #m) in which HARQ-ACK is transmitted, within a range that goes (X−1) ms backward from SF #n where HARQ-ACK is transmitted. To be more specific, when there is a UL subframe (SF #m) in which HARQ-ACK is transmitted within the range back to (X−1) ms before SF #n in which HARQ-ACK transmission is performed, the user terminal determines the codebook size of SF #n, by additionally taking into account the codebook size of HARQ-ACK of SF #m. Note that there may be more than one SF #m.

In this case, the user terminal can determine the codebook size of SF #n regardless of the result of LBT in SF #m (based only on the position of SF #m). Alternatively, the codebook size in SF #n may be controlled, taking into account the result of UL transmission (LBT result) in SF #m. For example, a structure may be employed here in which, to decide the codebook size in SF #n when an A/N is successfully transmitted in SF #m (LBT idle), the codebook size of SF #m is not taken into consideration.

If, on the other hand, SF #m is not present within a range of (X−1) ms going back from SF #n, the codebook size of SF #n is determined without considering the codebook size of other UL subframes. Note that although the second retention period (X) described above is assumed as the retention period here, this is not limiting. The above-described first retention period (Y) may be taken into account.

Figure 18:
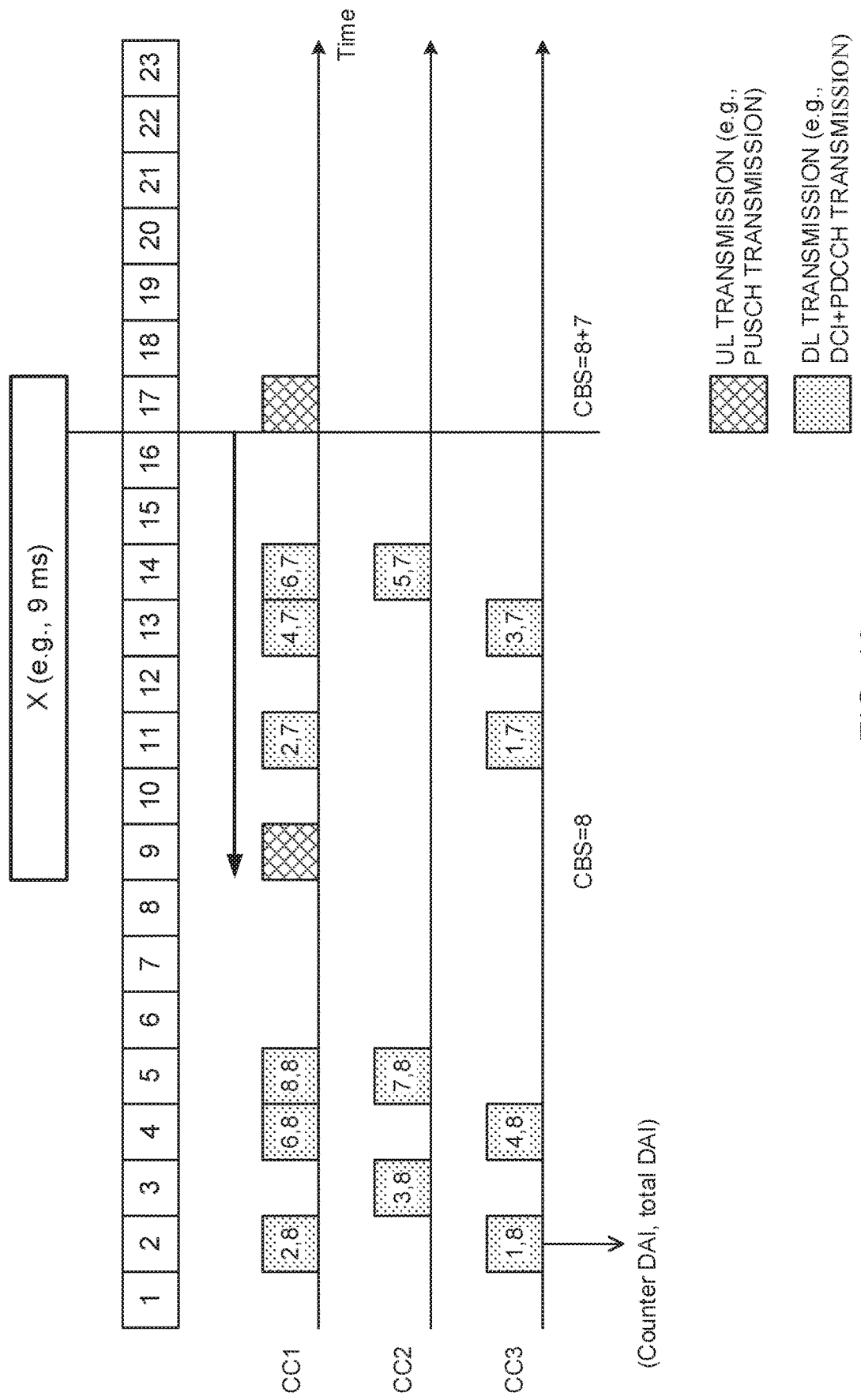
FIG. 18 is a diagram to illustrate another example of the method of determining the codebook size according to the fourth embodiment.

FIG. 18 illustrates an example where the codebook size is dynamically changed taking the A/N retention period into account. In the case illustrated in FIG. 18, A/Ns in response to the DL signals (for example, PDSCH) transmitted in SF #2 to SF #5 are transmitted in SF #9, and A/Ns in response to the DL signals transmitted in SF #11 to SF #14 are transmitted in SF #17.

Furthermore, in FIG. 18, the A/N transmission (codebook size, etc.) in each UL subframe SF #9 and #17 is controlled based on DAIs (Downlink Assignment Indicators (Indices)) included in DL signals. As for the DAIs to be included in DL signals (for example, DCI), a counter DAI (also referred to as "C-DAI," and so on), a total DAI (also referred to as a "T-DAI" and so on), and others are stipulated.

The counter DAI is information (count value) that is used to count the DL signals that are scheduled (in FDD, this corresponds to the number of CCs). The total DAI is information that indicates the number of DL signals that are scheduled (in FDD, this corresponds to the number of CCs). In the radio base station, the counter DAI and the total DAI are included in each CC's downlink control information and reported to the user terminal. Note that the counter DAI and/or the total DIA can be specified using two bits.

The user terminal can determine the number of scheduled DL signals (codebook size) based on the reported total DAI and can also determine the A/N for each DL signal based on the counter DAI.

For example, in FIG. 18, the DCI of each DL signal transmitted in SF #2 to SF #5 includes a different counter DAI (here, 1 to 8) and a common total DAI (here, 8). Here, since no DL signal with a counter DAI of 5 is received, the user terminal determines that the user terminal has failed to receive the DL signal with the counter DAI=5. The user terminal determines the A/N and codebook size (here, 8) in each DL subframe based on the counter DAI and the total DAI, and transmits multiple A/Ns in SF #9.

Furthermore, in FIG. 18, the DCI of each DL signal transmitted in SF #11 to SF #14 includes a different counter DAI (here, 1 to 7) and a common total DAI (here, 7). Here, since no DL signal with a counter DAI of 7 is received, the user terminal can determine that the user terminal has failed to receive the DL signal with the counter DAI=7. The user terminal determines the A/N and codebook size (here, 7) of each DL subframe based on the counter DAI and the total DAI, and transmits multiple A/Ns in SF #17.

Thus, by determining the codebook size based on the total DAI, it is possible to dynamically change the codebook size taking into account the number of DL signals that are scheduled.

Furthermore, according to the present embodiment, when there is a UL subframe (SF #m) within a range of (X−1) ms going backward from SF #n where HARQ-ACK is transmitted, the codebook size of SF #n is determined by additionally taking into account the codebook size (for example, total DAI) of SF #m. For example, assume the case where the HARQ-ACK codebook size in the UL subframe of SF #17 in FIG. 18 is determined.

In this case, the user terminal checks whether or not a UL subframe is present in a range of a predetermined period (for example, X−1 or less) backward from SF #17. For example, if X=9 is configured, the user terminal checks whether or not a UL subframe is present within a range of eight subframes backward from SF #17 (that is, in SFs #9 to #16). In FIG. 18, since there is a UL subframe in SF #9, the user terminal determines the codebook size in SF #17 taking into consideration the codebook size (for example, the total DAI) in SF #9, and carries out A/N transmission accordingly.

To be more specific, the user terminal combines the codebook size in SF #9 (here, 8) and the codebook size (here, 7) of the A/Ns transmitted in response to the DL signals of SFs #11 to #14, and uses the resulting value (CBS=8+7) as the codebook size for SF #17. Then, the user terminal feeds back A/Ns in response to the DL signals of SFs #2 to #5 and A/Ns in response to the DL signals of SFs #11 to #14 using this codebook size.

Figure 19:
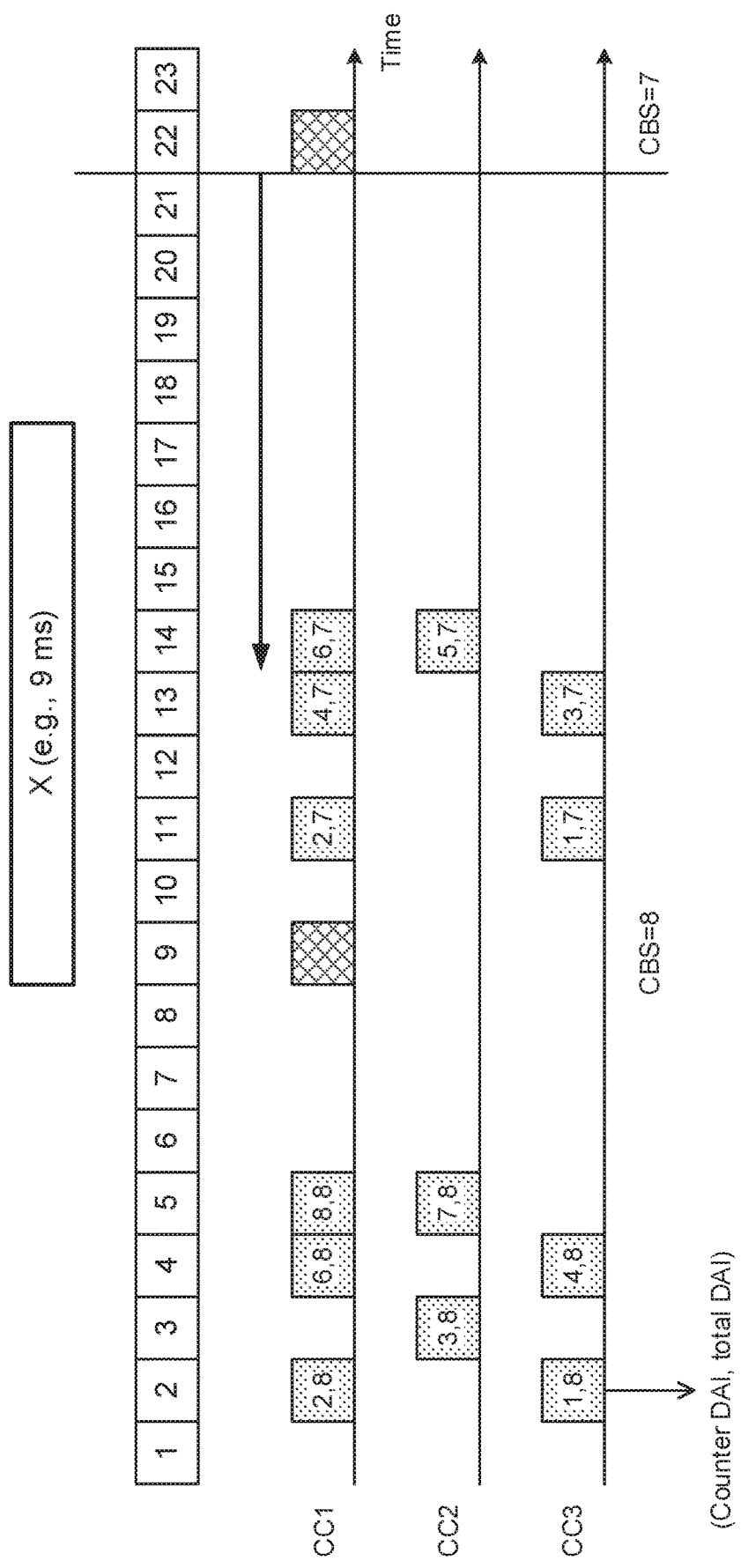
FIG. 19 is a diagram to illustrate another example of the method of determining the codebook size according to the fourth embodiment.

On the other hand, if, as illustrated in FIG. 19, there is no UL subframe (SF #m) within a range of (X−1) ms going backward, from SF #n in which HARQ-ACK is transmitted, the user terminal determines the codebook size for SF #n without considering the codebook size in SF #m. For example, assume the case where the codebook size in the UL subframe of SF #22 in FIG. 19 is determined. Note that, FIG. 19 is equivalent to a case where the subframe of SF #17 in FIG. 18 is replaced by SF #22.

In this case, the user terminal checks whether or not a UL subframe is present within a range of a predetermined period (for example, X−1 or less) backward from SF #22. For example, when X=9 is configured, the user terminal checks whether or not a UL subframe is present within a range of eight subframes backward from SF #22 (that is, in SFs #14 to #21). In FIG. 19, the UL subframe that is configured before SF #22 is SF #9 (which is beyond X−1 ms), so that the user terminal determines the codebook size of SF #22 without considering the codebook size in SF #9, and performs A/N transmission accordingly.

To be more specific, the user terminal determines the codebook size (here, 7) of the A/Ns to transmit in response to the DL signals of SFs #11 to #14 as the codebook size in SF #22. Then, the user terminal feeds back A/Ns in response to the DL signals of SFs #11 to #14 using this codebook size.

That is, in the case illustrated in FIG. 19, since the A/Ns transmitted in SF #9 (the A/Ns transmitted in response to the DL signals of SFs #2 to #5) are not retained in SF #22, the user terminal performs A/N transmission without takes into consideration the A/Ns in SF #9. In this way, the codebook size is changed dynamically by taking into account the period for retaining A/Ns, so that it is possible to prevent the opportunities for transmitting A/Ns from reducing due to LBT results (LBT busy), and, furthermore, prevent the overhead of the codebook size from increasing.

HARQ-ACK transmission in LAA SCells is assumed to be configured so that only A/Ns that have failed to be transmitted due to "LBT busy" are transmitted at different timings than in existing system (that is, an A/N, once transmitted successfully, is not transmitted at a timing different from the existing one). By means of this configuration, the dynamic codebook size, which has been described above, can be suitably applied.

(Radio Communication System)

Now, the structure of the radio communication system according to one embodiment of the present invention will be described below. In this radio communication system, the radio communication method according to one and/or a combination of the above-described embodiments of the present invention is employed.

Figure 11:
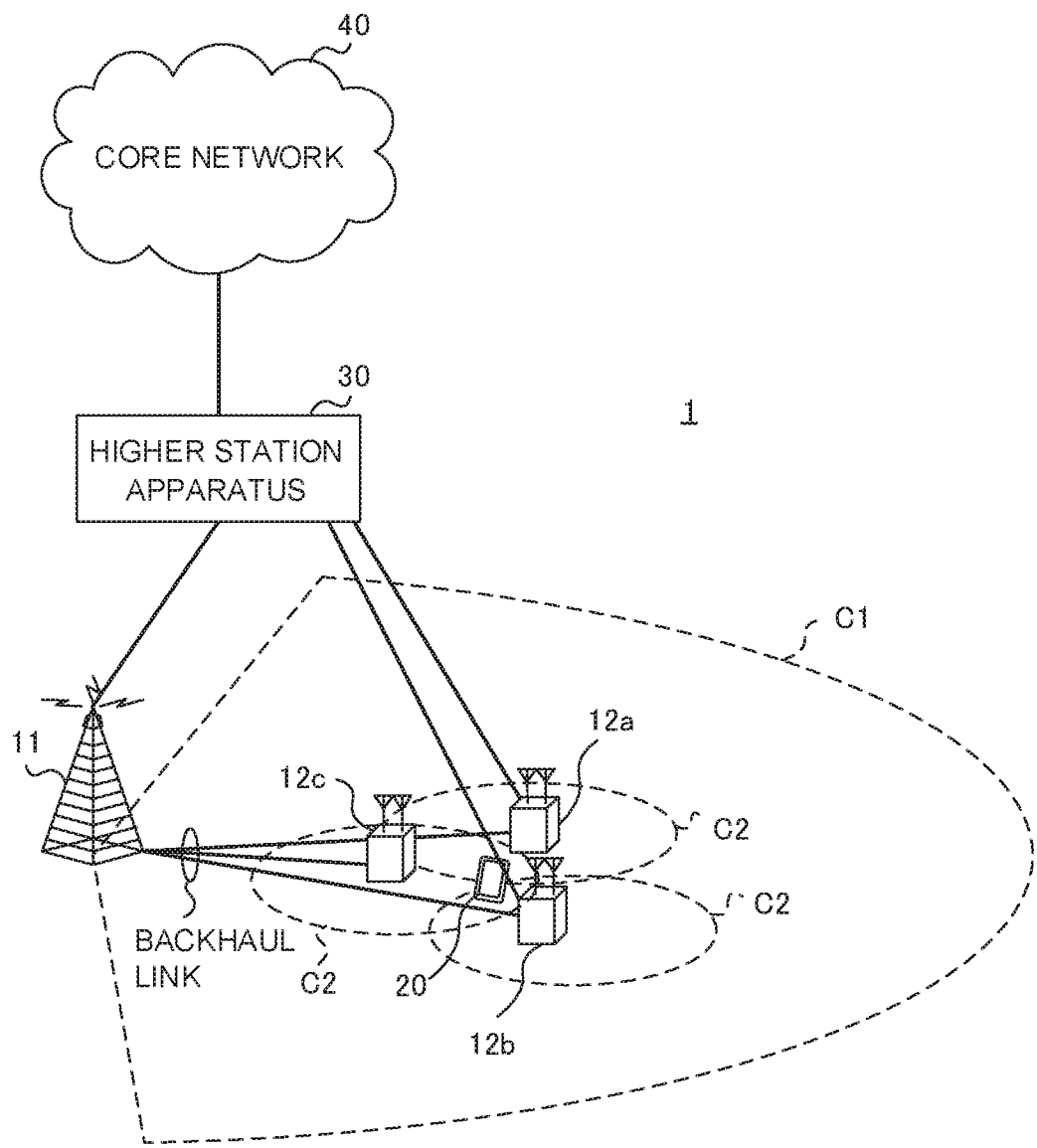
FIG. 11 is a diagram to illustrate an example of a schematic structure of a radio communication system according to one embodiment of the present invention.

FIG. 11 is a diagram to illustrate an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth constitutes 1 unit.

Also, the radio communication system 1 has a radio base station (for example, an LTE-U base station) that is capable of using unlicensed bands.

Note that the radio communication system 1 may be referred to as "SUPER 3G," "LTE-A" (LTE-Advanced), "IMT-Advanced," "4G" (4th generation mobile communication system), "5G" (5th generation mobile communication system), "FRA" (Future Radio Access) and so on.

The radio communication system 1 illustrated in FIG. 11 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the DL signal configuration) related to a radio base station 12 (which is, for example, an LTE-U base station) that uses an unlicensed band, from the radio base station 11 that uses a licensed band to the user terminals 20. Furthermore, a structure may be employed here in which, when CA is applied between a licensed band and an unlicensed band, 1 radio base station (for example, the radio base station 11) controls the scheduling of licensed band cells and unlicensed band cells.

Note that it is equally possible to adopt a structure in which a user terminal 20 connects with the radio base stations 12, without connecting with the radio base station 11. For example, it is possible to adopt a structure in which a radio base station 12 that uses an unlicensed band establishes a stand-alone connection with a user terminal 20. In this case, the radio base station 12 controls the scheduling of unlicensed band cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise. Also, it is preferable to configure radio base stations 10 that use the same unlicensed band on a shared basis to be synchronized in time.

The user terminals 20 are terminals that support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink and SC-FDMA (Single-Carrier Frequency Division Multiple Access) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACK/NACK) in response to the PUSCH are communicated by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an "uplink data channel." User data and higher layer control information are communicated by the PUSCH. Also, downlink radio quality information (CQI: Channel Quality Indicator), delivery acknowledgment information (ACK/NACK) and so on are communicated by the PUCCH. By means of the PRACH, random access preambles for establishing connections with cells are communicated.

In the radio communication systems 1, cell-specific reference signals (CRSs), channel state information reference signals (CSI-RSs), demodulation reference signal (DMRSs) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 12:
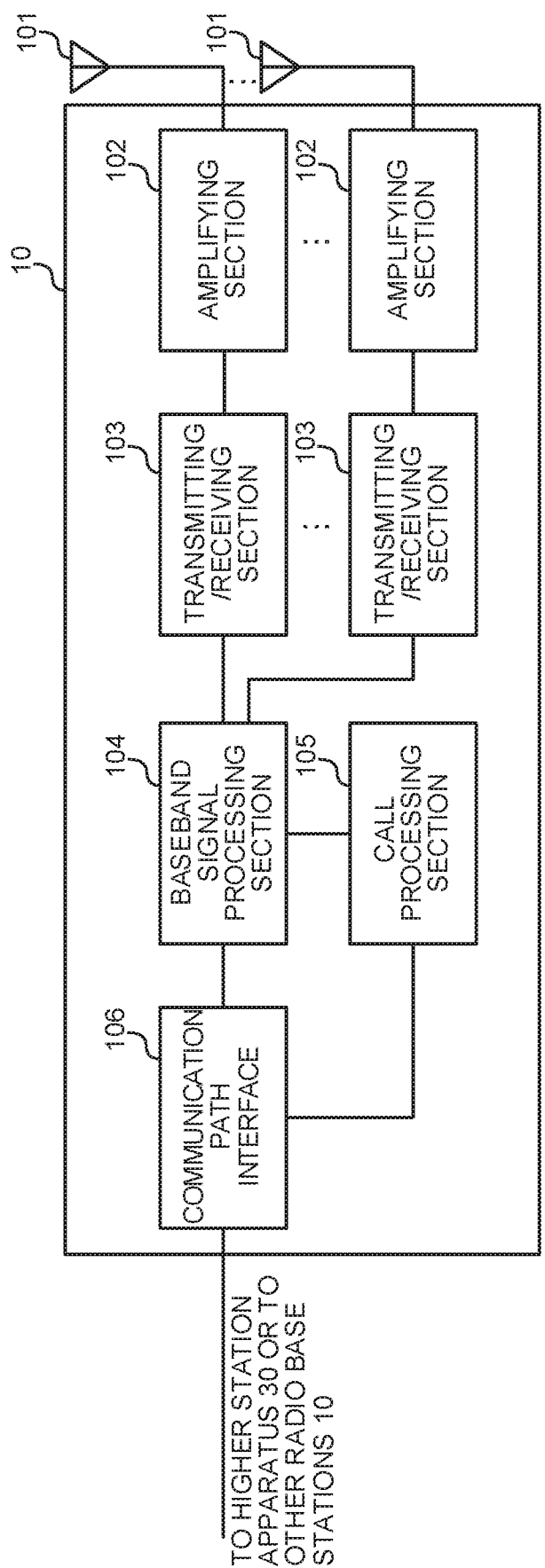
FIG. 12 is a diagram to illustrate an example of an overall structure of a radio base station according to one embodiment of the present invention.

FIG. 12 is a diagram to illustrate an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 are capable of transmitting/receiving UL/DL signals in unlicensed bands. Note that the transmitting/receiving sections 103 may be capable of transmitting/receiving UL/DL signals in licensed bands as well. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit downlink control information (DCI) and/or higher layer signaling (for example, RRC signaling), which include PUCCH cell configuration information, information as to whether or not simultaneous PUCCH and PUSCH transmission is possible, information about UCI transmission modes, and information about UCI retention periods, and so on, to the user terminal 20 in licensed CCs and/or unlicensed CCs. In addition, the transmitting/receiving sections 103 can receive the PUSCH from the user terminal 20 at least in unlicensed CCs.

Figure 13:
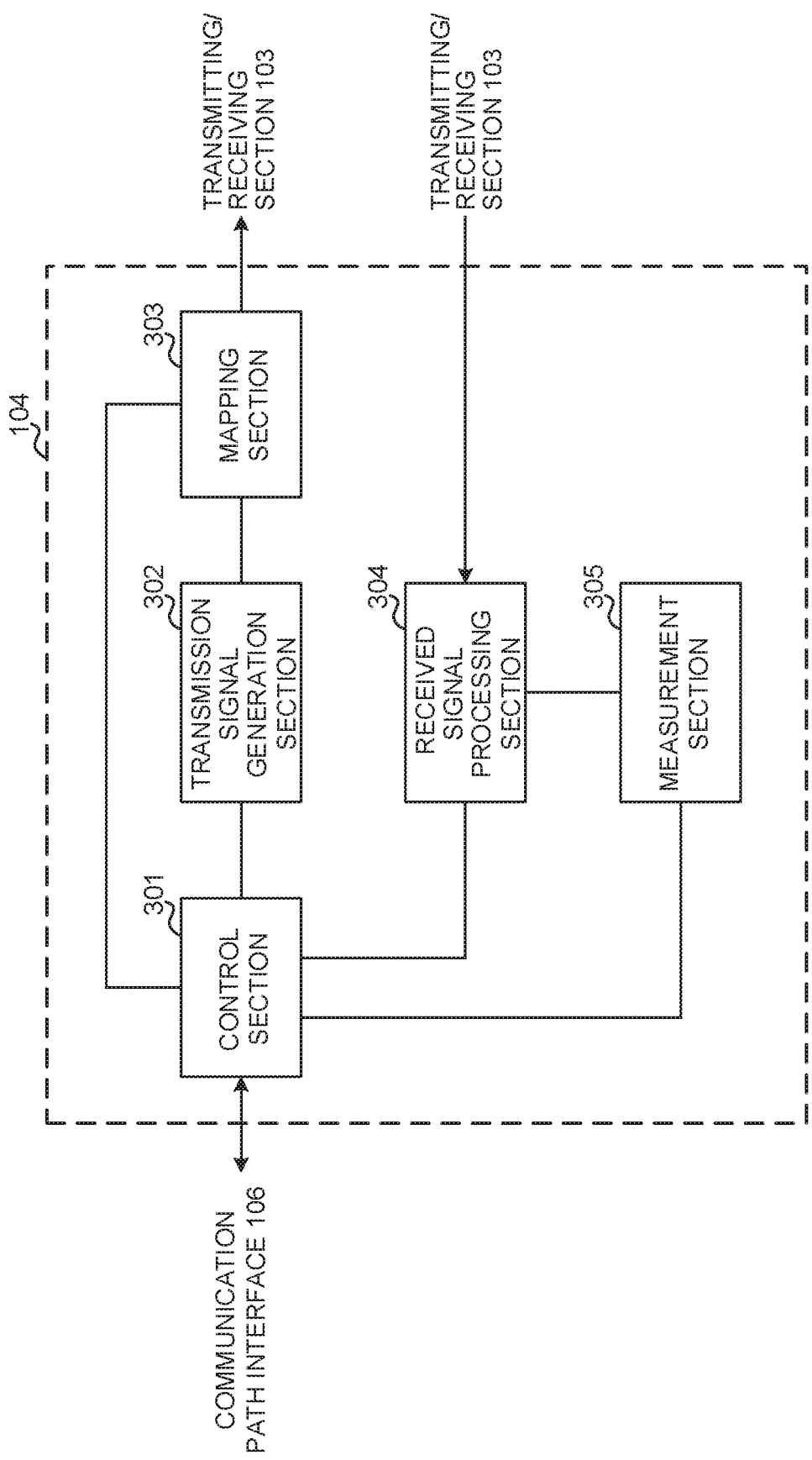
FIG. 13 is a diagram to illustrate an example of a functional structure of a radio base station according to one embodiment of the present invention.

FIG. 13 is a diagram to illustrate an example of a functional structure of a radio base station according to one embodiment of the present invention. Note that, although FIG. 10 primarily illustrates functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. Note that, when a licensed band and an unlicensed band are scheduled with 1 control section (scheduler) 301, the control section 301 controls communication in licensed band cells and unlicensed band cells. For the control section 301, a controller, a control circuit or control apparatus that can be described based on common understanding of the technical field to which the present invention pertains can be used.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of downlink reference signals such as synchronization signals (the PSS (Primary Synchronization Signal) and the SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 may control the transmission signal generation section 302 and the mapping section 303 to transmit downlink signals (for example, PDCCH/EPDCCH) in carriers (for example, unlicensed CCs) where listening is performed before downlink transmission according to the LBT result obtained in the measurement section 305.

The control section 301 may exert control so that UE capability information as to whether or not PF 4/5 are supported in at least one of the LBT carriers is obtained from the received signal processing section 304, the PUCCH cell of LAA SCells is determined based on this capability information, and PUCCH cell configuration information pertaining to this cell is transmitted to the user terminal 20.

The control section 301 may exert control so that information as to whether or not simultaneous transmission of PUCCH and PUSCH is possible, information about UCI transmission modes, information about UCI retention periods and so on are transmitted to the user terminal 20.

Furthermore, the control section 301 may determine in which cell the user terminal transmits UCI based on the various pieces of information transmitted to the user terminal 20, and perform the receiving process and scheduling accordingly.

Furthermore, the control section 301 may control (determine) the codebook size to use to transmit an A/N based on the time the A/N (retransmission control information) is retained in the user terminal 20 (for example, at least one of the first retention time (Y) and the second retention time (X)). Furthermore, the control section 301 may control the codebook size based on the number of CCs, in addition to the time the A/N is retained.

The codebook size may be a fixed size that is uniquely determined in each TTI (also referred to as "fixed codebook size," as illustrated in FIG. 17), or may be a size that is dynamically changed (also referred to as "dynamic codebook size," as illustrated in FIGS. 18 and 19). The fixed codebook size may be equal to the maximum number of A/Ns that may be transmitted in each TTI.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 executes LBT in a carrier where LBT is configured (for example, an unlicensed band) based on commands from the control section 301, and outputs the results of LBT (for example, judgments as to whether the channel state is free or busy) to the control section 301.

Also, the measurement section 305 may measure, for example, the received power (for example, RSRP (Reference Signal Received Power)), the received signal strength (for example, RSSI (Received Signal Strength Indicator)), the received quality (for example, RSRQ (Reference Signal Received Quality)) and the channel states of the received signals. The measurement results may be output to the control section 301.

(User Terminal)

Figure 14:
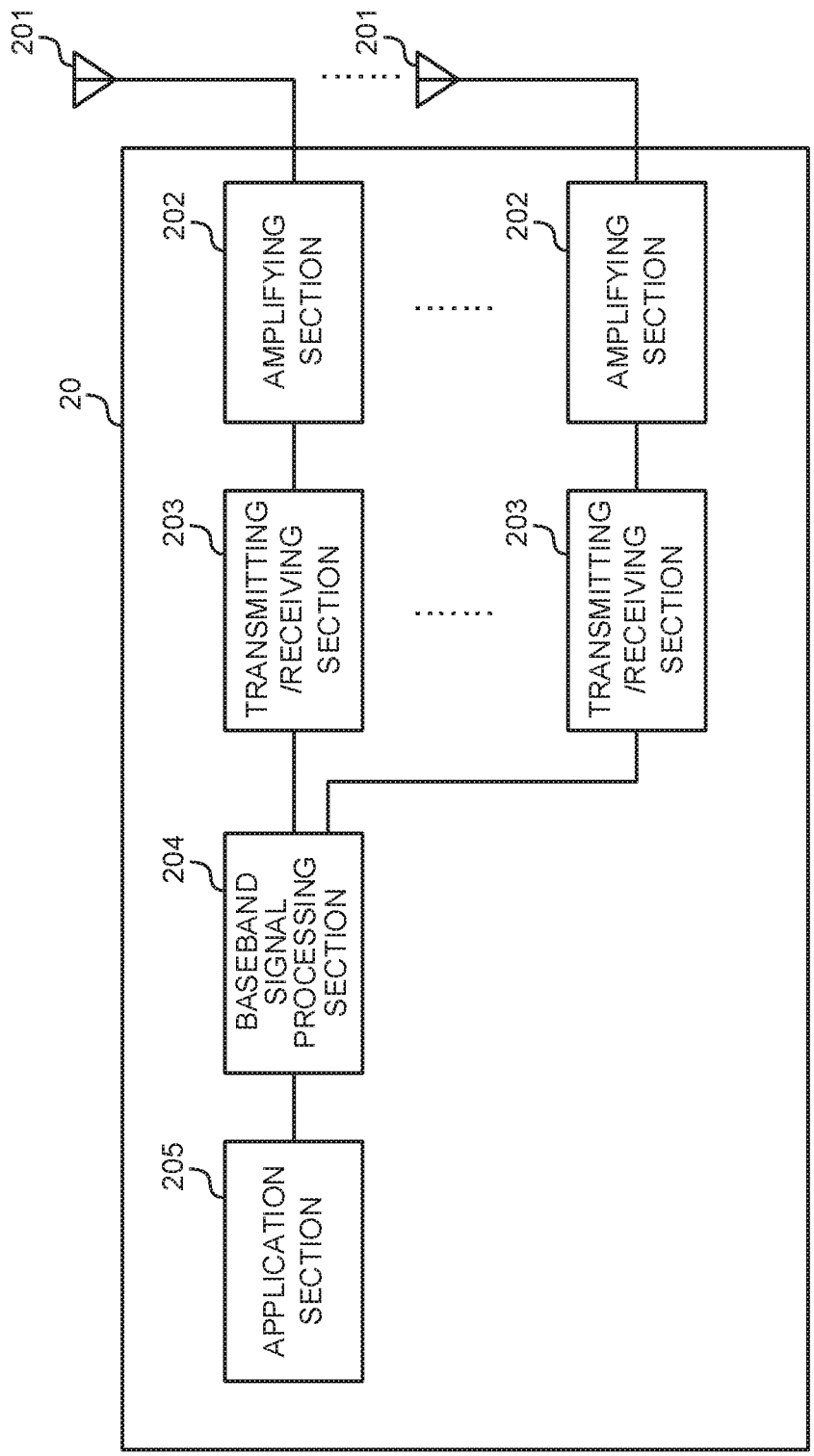
FIG. 14 is a diagram to illustrate an example of an overall structure of a user terminal according to one embodiment of the present invention.

FIG. 14 is a diagram to illustrate an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 are capable of transmitting/receiving UL/DL signals in unlicensed bands. Note that the transmitting/receiving sections 203 may be capable of transmitting/receiving UL/DL signals in licensed bands as well.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive downlink control information (DCI) including PUCCH cell configuration information, information as to whether or not simultaneous PUCCH and PUSCH transmission is possible, information about UCI transmission modes, information about UCI retention periods, etc. and/or higher layer signaling (for example, RRC signaling), from the radio base station 10, in licensed CCs and/or unlicensed CCs. In addition, the transmitting/receiving sections 203 can transmit the PUSCH to the radio base station 10 at least in unlicensed CCs.

Figure 15:
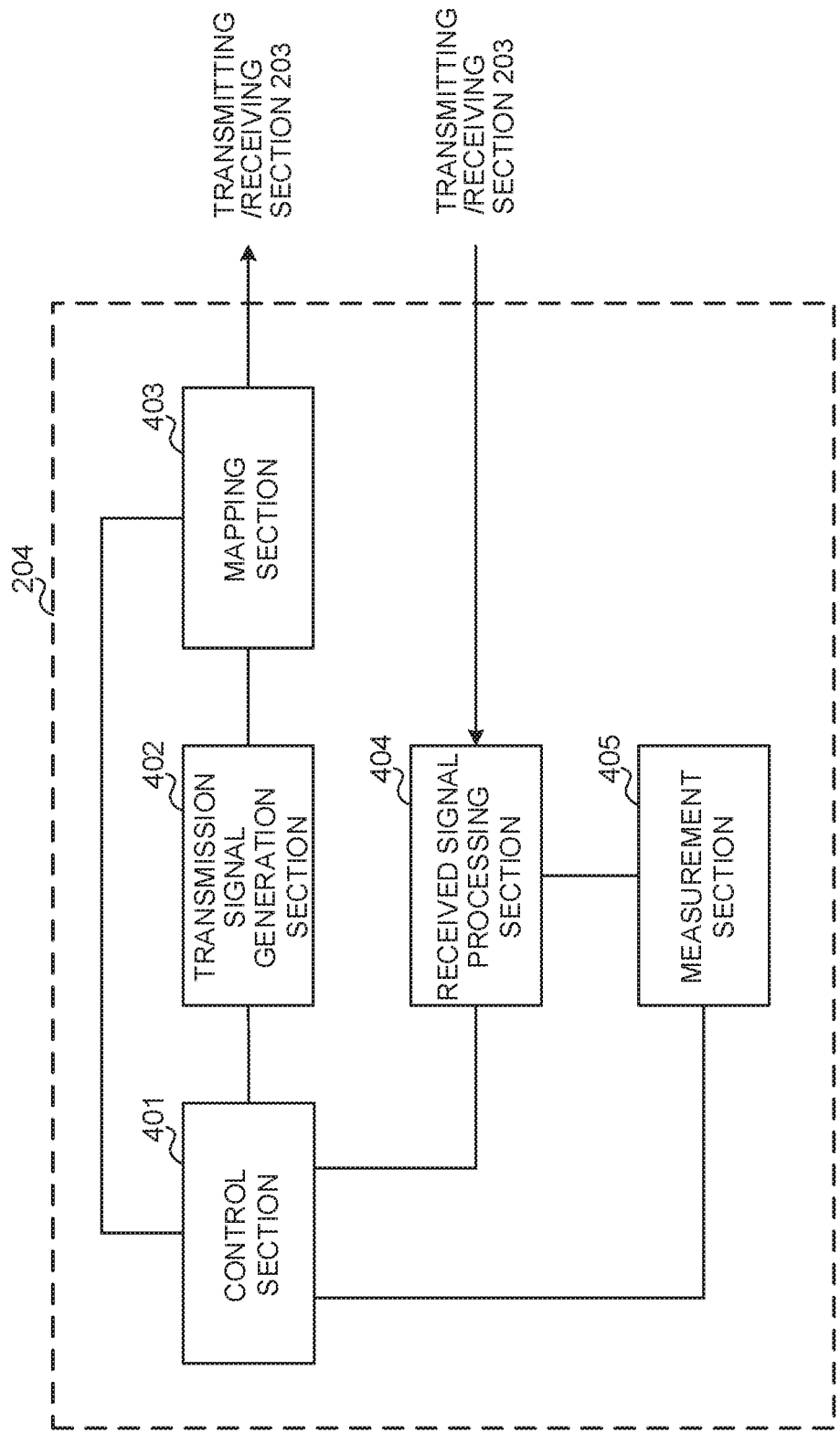
FIG. 15 is a diagram to illustrate an example of a functional structure of a user terminal according to one embodiment of the present invention.

FIG. 15 is a diagram to illustrate an example of a functional structure of a user terminal according to one embodiment of the present invention. Note that, although FIG. 15 primarily illustrates functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

The control section 401 may control the transmission signal generation section 402 and the mapping section 403 to transmit uplink signals (for example, PUCCH, PUSCH, etc.) in carriers (LBT carriers) where listening is performed before uplink transmission, according to LBT results acquired in the measurement section 405.

The control section 401 determines whether or not PUCCH transmission is possible in LAA SCells, based on information (PUCCH cell configuration information) as to whether or not at least one of the LBT carriers is a cell where PUCCH is transmitted ("PUCCH cell," "PUCCH SCell," etc.), acquired from the received signal processing section 404, and controls the transmission of UCI in each LAA SCell.

The control section 401 can obtain information as to whether simultaneous transmission of an uplink control channel (for example, PUCCH) and an uplink shared channel (for example, PUSCH) is possible, from the received signal processing section 404. Furthermore, if the control section 401 determines that PUCCH transmission is possible in one of the LAA SCells based on the PUCCH cell configuration information, the control section 401 can further control the transmission of UCI in each LAA SCell based on this information as to whether or not simultaneous transmission is possible.

The control section 401 may obtain information related to UCI transmission modes, which specify in which carriers various UCIs pertaining to non-LBT carriers and LBT carriers are transmitted, from the received signal processing section 404. Furthermore, when the control section 401 determines that PUCCH transmission is not possible in any of the LAA SCells, based on the PUCCH cell configuration information, the control section 401 can further control the transmission of UCI in each LAA SCell based on this UCI transmission mode-related information.

The control section 401 may exert control so that UE capability information as to whether PF 4/5 are supported in at least one of the LBT carriers is transmitted.

The control section 401 may exert control so that various UCIs are retained for a predetermined period of time (for example, for a first retention period, a second retention period, etc.), and a plurality of UCIs (for example, all UCIs of all LAA SCells) that are retained for LBT carriers are transmitted simultaneously (together) in at least one LAA SCell.

The control section 401 may control the codebook size to use to transmit an A/N based on the time the A/N (retransmission control information) is retained (for example, at least one of the first retention time (Y) and the second retention time (X)). Also, the control section 401 may control (determines) the codebook size based on the number of CCs, in addition to the retention time of the A/N.

The codebook size may be a fixed size that is uniquely determined in each TTI (also referred to as "fixed codebook size," as illustrated in FIG. 17), or may be a size that is changed dynamically (also referred to as "dynamic codebook size," as illustrated in FIG. 18 and FIG. 19). The fixed codebook size may be equal to the maximum number of A/Ns that can be transmitted in each TTI.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generating section 402 generates uplink control signals such as delivery acknowledgement signals (HARQ-ACKs), channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 executes LBT in carriers where LBT is configured, based on commands from the control section 401. The measurement section 405 may output the results of LBT (for example, judgments as to whether the channel state is free or busy) to the control section 401.

Also, the measurement section 405 may measure the received power (for example, RSRP), the received signal strength (RSSI), the received quality (for example, RSRQ) and the channel states and so on of the received signals. The measurement results may be output to the control section 401.

(Hardware Structure)

Note that the block diagrams that have been used to describe the above embodiments indicate blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 16:
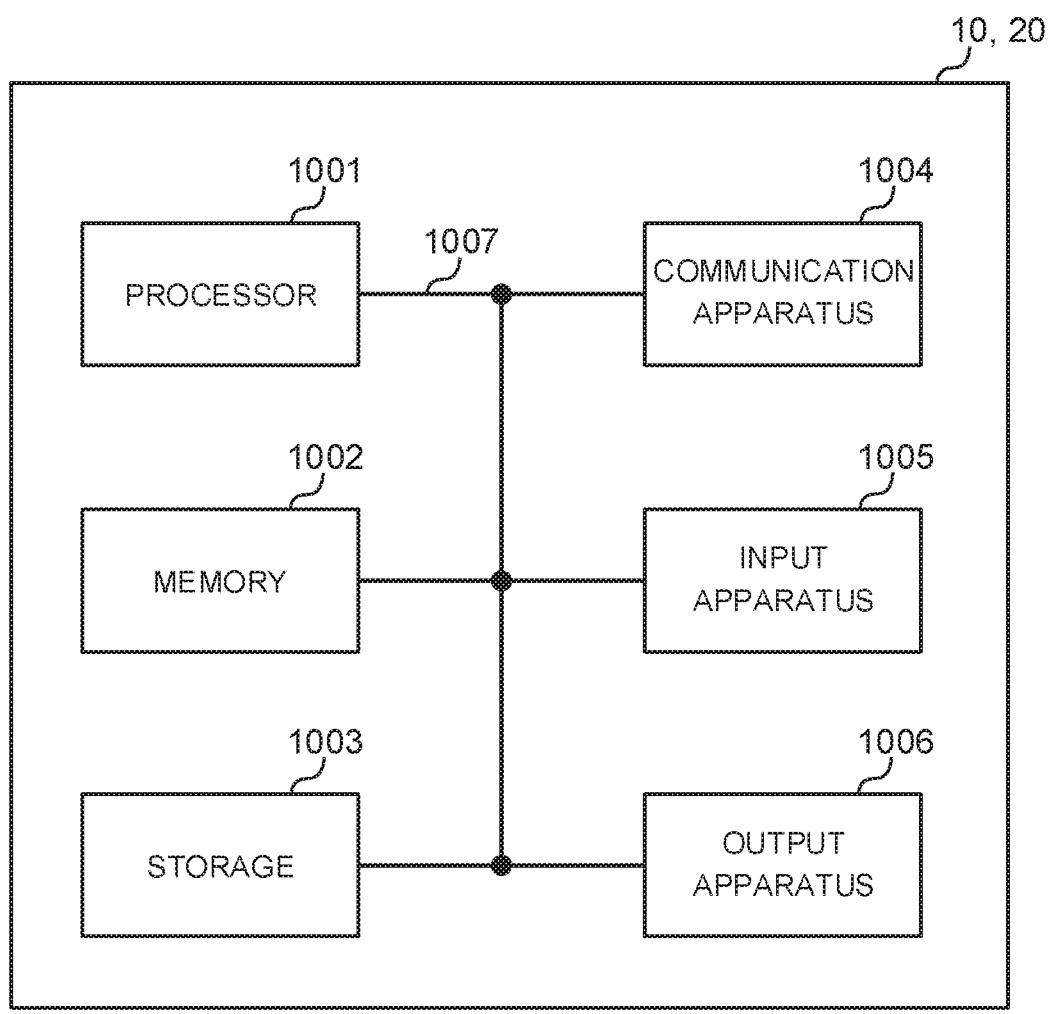
FIG. 16 is a diagram to illustrate an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 16 is a diagram to illustrate an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus illustrated in the drawings, or may be designed not to include part of the apparatus.

For example, although only one processor 1001 is illustrated, a plurality of processors may be provided. Furthermore, processes may be implemented with one processor, or processes may be implemented in sequence, or in different manners, on one or more processors.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, predetermined information (for example, reporting of information to the effect that "X holds") does not necessarily have to be reported explicitly, and can be reported in an implicit manner (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

As used herein the terms" determining "and" determining "encompass a wide variety of actions. For example, to "decide" and "determine" as used herein may be interpreted to mean making decisions and determinations related to calculating, computing, processing, deriving, investigating, looking up (for example, searching a table, a database or some other data structure), ascertaining and so on. Furthermore, to "decide" and "determine" as used herein may be interpreted to mean making decisions and determinations related to receiving (for example, receiving information), transmitting (for example, transmitting information), inputting, outputting, accessing (for example, accessing data in a memory) and so on. In addition, to "decide" and "determine" as used herein may be interpreted to mean making decisions and determinations related to resolving, selecting, choosing, establishing, comparing and so on.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:
1. A terminal comprising:
a receiver that receives a first physical downlink shared channel (PDSCH) and a second PDSCH subsequent to the first PDSCH;
a processor that controls a period to hold an uplink control information (UCI) corresponding to the first PDSCH based on first information provided by a first downlink control information (DCI) that schedules the first PDSCH and on second information provided by a second DCI that schedules the second PDSCH; and a transmitter that transmits multiple UCIs, including the UCI held in the period, together.

2. The terminal according to claim 1, wherein the transmitter transmits the multiple UCIs in a cell in which listening is performed before uplink transmission.

3. A radio communication method for a terminal, comprising:
receiving a first physical downlink shared channel (PDSCH) and a second PDSCH subsequent to the first PDSCH;
controlling a period to hold an uplink control information corresponding to the first PDSCH (UCI) based on first information provided by a first downlink control information (DCI) that schedules the first PDSCH and on second information provided by a second DCI that schedules the second PDSCH; and
transmitting multiple UCIs, including the UCI held in the period, together.

4. A base station comprising:
a transmitter that transmits a first downlink control information (DCI) to provide first information for controlling a period to hold an uplink control information (UCI) corresponding to a first physical downlink shared channel (PDSCH) and a second DCI to provide second information for controlling a period to hold the UCI, and transmits the first PDSCH scheduled by the first DCI and a second PDSCH scheduled by the second DCI; and
a receiver that receives multiple UCIs, including the UCI held in the period, together.

* * * * *